United States Patent
Deering et al.

(10) Patent No.: US 6,628,277 B1
(45) Date of Patent: Sep. 30, 2003

(54) DECOMPRESSION OF THREE-DIMENSIONAL GRAPHICS DATA USING MESH BUFFER REFERENCES TO REDUCE REDUNDANCY OF PROCESSING

(75) Inventors: Michael F. Deering, Los Altos, CA (US); Marc Tremblay, Menlo Park, CA (US); Jeffrey Chan, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/332,627

(22) Filed: Jun. 14, 1999

(51) Int. Cl.[7] ............................................... G06T 17/00
(52) U.S. Cl. ...................................................... 345/419
(58) Field of Search ................................ 345/419, 420, 345/421, 423, 426, 427, 428, 581, 502, 503, 505, 506; 382/233, 234, 236, 241, 243

(56) References Cited

U.S. PATENT DOCUMENTS 5,793,371 A    8/1998  Deering
5,867,167 A    2/1999  Deering
6,047,088 A  * 4/2000  Van Beek et al. .......... 382/243

OTHER PUBLICATIONS

Foley et al. "Computer Graphics: Principles and Practice" second edition in C, pp 202 222–226, 868, 878, 1996.*
Bjernfalk, "The Memory System Makes The Difference," © 1999 Evans & Sutherland Computer Corporation, pp. 1–11.

* cited by examiner

Primary Examiner—Almis R. Jankus
(74) Attorney, Agent, or Firm—Meyertons Hood Kivlin Kowert & Goetzel, P.C.; Jeffrey C. Hood

(57) ABSTRACT

A graphics system and method for reducing redundant transformation calculations and lighting calculations performed on vertices that are shared by more than one geometric primitive is disclosed. The reduction in redundant calculations is accomplished by delaying the formation of geometric primitives until after transformation and lighting has been performed on the vertices. Transformation and or lighting are performed independently on a vertex-by-vertex basis without reference to which geometric primitives the vertices belong to. After transformation and or lighting, geometric primitives may be formed utilizing previously generated connectivity information. The connectivity information may include mesh buffer references, vertex tags, or other types of information.

47 Claims, 18 Drawing Sheets

Vertex1 X, Y, Z, R, G, B,   Nx, Ny, Nz, etc.
Vertex2 X, Y, Z, R, G, B,   Nx, Ny, Nz, etc.
Vertex3 X, Y, Z, R, G, B,   Nx, Ny, Nz, etc.
reuse Vertex2
reuse Vertex3
Vertex4 X, Y, Z, R, G, B,   Nx, Ny, Nz, etc.
reuse Vertex3
reuse Vertex4
Vertex5 X, Y, Z, R, G, B,   Nx, Ny, Nz, etc.
reuse Vertex1
reuse Vertex3
reuse Vertex5

*FIG. 5*

Vertex1 X, Y, Z, R, G, B,   Nx, Ny, Nz, etc.
Vertex2 X, Y, Z, R, G, B,   Nx, Ny, Nz, etc.
Vertex3 X, Y, Z, R, G, B,   Nx, Ny, Nz, etc.
Vertex2 X, Y, Z, R, G, B,   Nx, Ny, Nz, etc.
Vertex3 X, Y, Z, R, G, B,   Nx, Ny, Nz, etc.
Vertex4 X, Y, Z, R, G, B,   Nx, Ny, Nz, etc.
Vertex3 X, Y, Z, R, G, B,   Nx, Ny, Nz, etc.
Vertex4 X, Y, Z, R, G, B,   Nx, Ny, Nz, etc.
Vertex5 X, Y, Z, R, G, B,   Nx, Ny, Nz, etc.
Vertex1 X, Y, Z, R, G, B,   Nx, Ny, Nz, etc.
Vertex3 X, Y, Z, R, G, B,   Nx, Ny, Nz, etc.
Vertex5 X, Y, Z, R, G, B,   Nx, Ny, Nz, etc.
et. seq.

*FIG. 4*

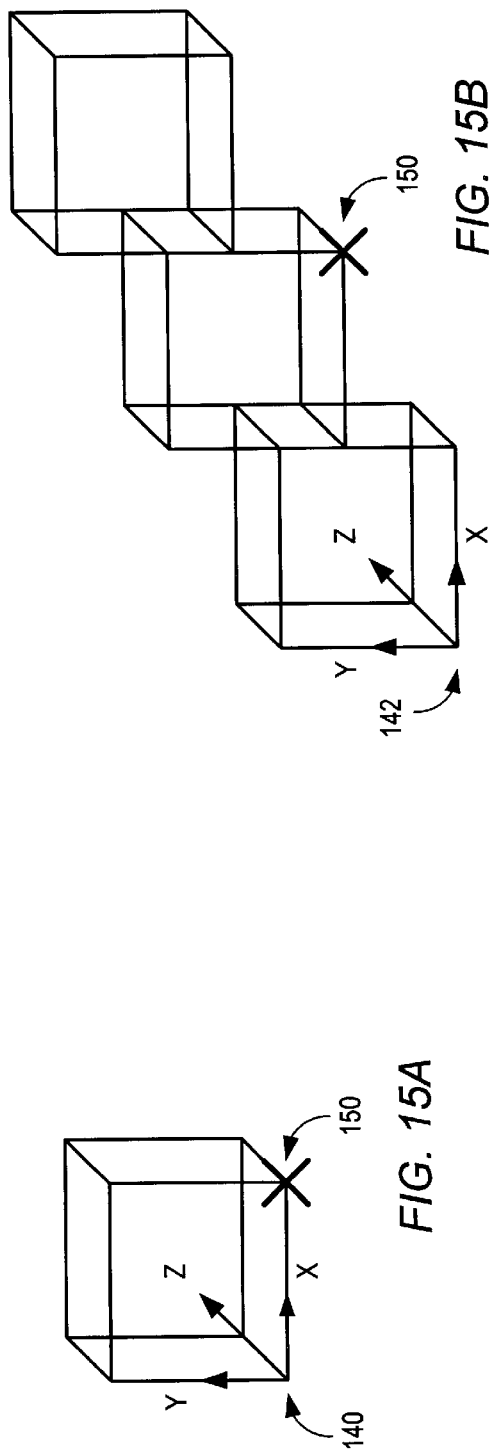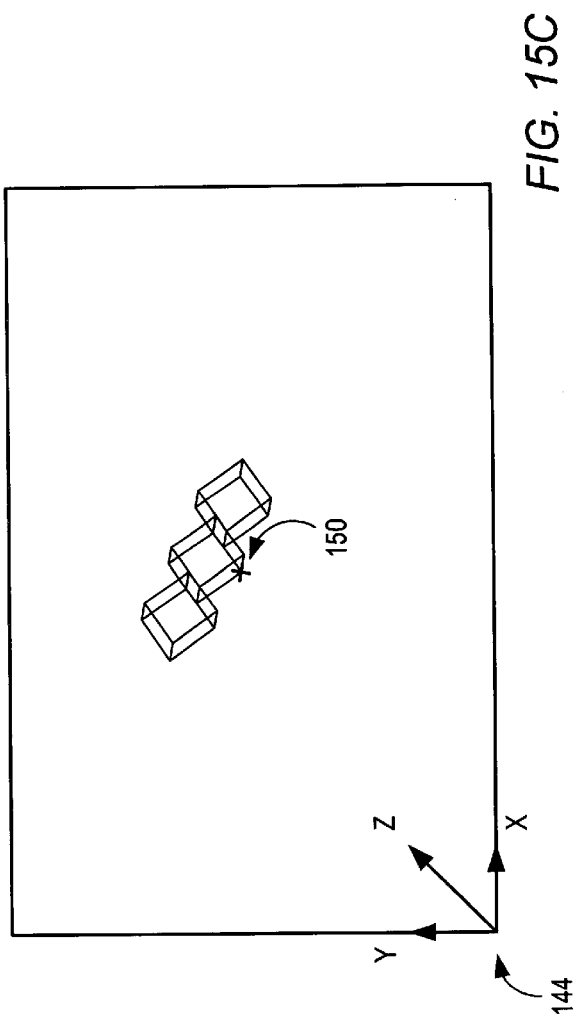

DECOMPRESSION OF THREE-DIMENSIONAL GRAPHICS DATA USING MESH BUFFER REFERENCES TO REDUCE REDUNDANCY OF PROCESSING

FIELD OF THE INVENTION

The present invention relates to computer graphics systems, and more particularly, to decompressing and rendering compressed three-dimensional geometry data.

DESCRIPTION OF THE RELATED ART

In recent years, demand for high performance graphics systems that can render complex three-dimensional (3D) objects and scenes has increased substantially. This increase is at least in part due to new applications such as computer-generated animation for motion pictures, virtual reality simulators/trainers, and interactive computer games. These new applications place tremendous demands upon graphics systems. One area in which particularly high demands are placed on graphics systems is bandwidth. This is because 3D graphics data may be several orders of magnitude larger than comparable 2D graphics data. For example, simple 2D graphics data may simply include color information for each pixel displayed. In contrast, 3D graphics data may include x,y,z position information, normal information, color information, transparency information, texture map information, reflectivity information, and additional information. This information is collectively referred to herein as "vertex component information".

A number of different techniques have been proposed to reduce the bandwidth requirements of 3D graphics data. One such technique is known as geometry compression. One type of geometry compression is described in detail in U.S. Pat. No. 5,793,371, issued on Aug. 11, 1998, entitled "Method and Apparatus for Geometric Compression of Three-Dimensional Graphics Data" by Michael F. Deering, which is incorporated herein by reference in its entirety. Generally speaking, geometry compression relies upon reusing vertices (among other techniques) to reduce the size of the 3D graphics data. To describe a 3D object, a number of points (called vertices) are specified. Each vertex may have a number of attributes associated with it. For example, each vertex may have color information associated with it. Other attribute that may be associated with vertices are texture map coordinates, normals, color, and transparency information. For example, if a texture of marble is texture-mapped onto a sphere, each vertex on the sphere may have a texture map coordinate specifying how the texture should be applied (i.e., which part of the sample texture should be mapped to that particular vertex). A normal is a vector from the vertex that is perpendicular to the surface of the object at the vertex. This is illustrated in the 3D object of FIG. 1. The 3D object may be represented by a number of vertices (represented as dots in the figure). Normals for the object are represented by arrows that extend perpendicularly from the object's surface at each vertex point.

Normals are vectors or directions in three-dimensional space. In the context of 3D graphics, normals (also called surface normals) may each indicate the local orientation of the surface of a 3D graphics object. Since the starting point of the vector is known from the xyz coordinates of the vertex, the normal may be specified with an x-component, a y-component, and a z-component (referred to as Nx, Ny, and Nz, respectively). In some embodiments, these components may be specified relative to the vertex. This embodiment is illustrated in FIG. 2. However, other forms for specifying normals are also possible. Furthermore, in some implementations the normal components are themselves normalized. A normalized normal is one in which the sum of the squares of Nx, Ny, and Nz equals a constant one.

In 3D graphics, vertices are typically grouped together to form polygons such as triangles, as shown in FIG. 3. By definition, a triangle has three vertices. However, many times triangles share vertices. In FIG. 3, vertices 1-2-3 form a first triangle and vertices 2-3-4 form a second triangle. Thus, vertices 2 and 3 are shared between the two triangles. 3D objects may be represented by specifying a number of triangles. This is shown in FIG. 4.

However, specifying all of the information associated with each vertex (e.g., xyz location, color, normal, etc.) every time a vertex is referenced as part of a triangle is inefficient. Instead, the information about a vertex can be stored (e.g., when it is first transmitted) for later use. Then, when the vertex is needed again for another triangle, the vertex may be read from storage instead of having to be re-transmitted. The vertex information may be stored in a "mesh buffer" and then reused. This may advantageously reduce the amount of information that must be transmitted and may thus save bandwidth. This is illustrated in FIG. 5.

To efficiently reuse vertices, the triangles may be organized into a mesh (e.g., a predetermined number of neighboring vertices. The mesh may then be encoded as one or more "triangle-strips". For example, in FIG. 6 of the application, the triangle strip may start with the following triangles: 6,1,7; 1,7,2; 7,2,3; 7,3,4; 7,4,8; 4,8,5; et seq.

As this pattern shows, once the triangle strip is started many subsequent triangles may be specified using only a single new vertex. For example, after triangle 6,1,7 has been constructed, triangle 1,7,2 may be constructed using only one new vertex (i.e., vertex 2). Thus, each vertex in the triangle strip may describe from ⅓ to one triangle. For example, in the list above, vertex 6 describes ⅓ of triangle 6,1,7. Vertex 2 describes one triangle 1,7,2. In some cases, a vertex may even describe two or even more triangles.

While a number of different formats are possible, one type of generalized triangle strip may be defined as follows (encoding the 3D object from FIG. 6):

R6, O1,O7,O2,O3, M4, M8, O5,O9,O10, M11 O17, M16, M9, O15, O8, O7, M14, O13, M6, O12, M18, M19, M20, M14, O21, O15, O22, O16, O23, O17, O24, M30, M29, M28, M22, O21, M20, M27, O26, M19, O25, O18

In the notation above, R is a restart tag (indicating that a new mesh is beginning), O denotes replace oldest, and M denotes replace middle. The operation of this type of generalized triangle strip is illustrated in FIGS. 7A–7H.

In some embodiments, the terms "oldest" and "middle" may be visualized as representing three registers that are used in forming triangles from the triangle strip representation. The sample encoding above is merely one nomenclature that may be used to represent how the vertices of the mesh are being encoded. Different implementations may use other nomenclatures. The example nomenclature uses letters (O and M) to indicate which vertex should be discarded from the three registers when forming a new triangle. O indicates the oldest vertex should be discarded. M indicates the middle vertex should be discarded. R indicates that a section of mesh is being started. This is used to clear the oldest, middle, and newest registers and the mesh buffer, if desired.

While this method reuses vertices, when vertex 8 is referenced a second time (i.e., by the command O8), the vertex is transmitted again. This retransmission of vertices may be reduced or avoided altogether by using a mesh buffer.

Using a similar nomenclature as in the previous example, a generalized triangle mesh utilizing a mesh buffer may be defined as follows (once again encoding the 3D object of FIG. 6):

R6p, O1, O7p, O2,O3, M4, M8p, O5, O9p, O10, M11, O17p, M16p, M-3, O15p, O-5, O-6, M14p, O13p, M-9, O12, M18p, M19p, M20p, M-5, O21p, O-24, O22p, O-9, O23, O-10, O-7, M30, M29, M28, M-1, O-2, M-3, M27, O26, M-4, O25, O-5

In this implementation, a trailing letter "p" denotes "push into mesh buffer". The number following a capital letter is a vertex number, and a negative number is the mesh buffer reference, in which "-1" denotes the most recent pushed vertex.

Thus, geometry compression may explicitly push old vertices (e.g., vertices with a trailing letter "p" above) into a mesh buffer. These old vertices may be explicitly referenced when the old vertex is again needed. This approach provides a fine control that supports irregular meshes of nearly any shape. As used herein, the term "mesh buffer" shall refer to this queue, and the expression "generalized triangle mesh" will refer to a combination of generalized triangle strips and mesh buffer references.

FIGS. 8A–8N illustrate one embodiment of this method graphically. The mesh buffer may be used to store designated vertices (i.e., those followed by a "p"). These vertices may later be read out of the mesh buffer (e.g., by a reference with a minus sign such as "M-3"). This allows vertices to be reused from the mesh buffer instead of having to be retransmitted.

As previously noted, by reducing the size of the 3D graphic data bandwidth may be saved. For example, when programmers are creating a 3D virtual object to be used in a simulation, they may execute a compression program to determine how best to compress the 3D object. The compression program may tessellate or divide the surface of the object into a plurality of vertices, e.g., a NURBs (Non-Uniform Rational B-spline) object. The compression program may then divide the vertices into groups of generalized triangle meshes as described above. These meshes may then be compressed and encoded using a similar process to that described above. The compressed data may then be stored (e.g., on a CD-ROM or DVD-ROM) and/or transmitted (e.g., on the Internet). The bandwidth savings may also apply to buses used for transmission of the 3D geometry data within the graphics system itself.

FIG. 9 illustrates one embodiment of a graphics system 20 configured to utilize compressed 3D geometry data in generalized triangle mesh form. In this embodiment, transmission bandwidth across transmission medium 10 is saved by transmitting 3D graphics data in compressed form using geometry compression in generalized triangle mesh format.

Generally, compressed 3D geometry data is conveyed to graphics system 20 on input bus 10. Geometry decompressor 12 receives the compressed data and decompresses it. A mesh buffer 14 may be used to store vertices that will be reused. As previously described, mesh buffer references may be encoded within the compressed data to indicate which vertices will be reused and thus should be stored in the mesh buffer.

Once a geometric primitive such as a triangle is decompressed, it is conveyed to one of a plurality of transform and lighting processors 18A–N. The transform and lighting processors work independently and in parallel to perform the following functions: (a) transform the vertices forming primitive from their original coordinate reference frame (e.g., object space) into a common reference frame (e.g., world space or screen space); and (b) "light" each vertex by determining which light sources affect each vertex and how much they are affected.

Next, the transformed and lit triangles are conveyed to draw processor 22, which is configured to render the transformed and lit primitives and apply texture mapping (e.g., from texture map memory 24). In some embodiments, textures may instead be applied during the lighting process (collectively referred to as "shading"). In some embodiments, when shading is used only micropolygons are drawn. Draw processor 22 is configured to rasterize the primitive into frame buffer 28. In most embodiments, frame buffer 28 is double buffered, with one buffer being draw into by draw processor 22 while the second buffer is being read by DACs 30. DACs 30 may read frame buffer 28 asynchronously with respect to draw processor 22. DACs 30 form an output video signal that is typically used to drive a display device such as a CRT monitor or LCD panel display.

For the reasons set forth above, the use of geometry compression is particularly advantageous in high performance graphics systems. However, further increases in performance are still demanded by modem applications. Thus, an efficient method for increasing the performance of graphics systems configured to utilize 3D graphics data that has been compressed into generalized triangle mesh format is desired. Furthermore, a graphics system capable of increased performance while utilizing compressed 3D geometry data is also desired.

SUMMARY OF THE INVENTION

The problems outlined above may, in part, be solved by a graphics system capable of delaying the formation of independent primitives until after transformation and/or lighting. In this way, vertices that are shared by more than one primitive have the potential to only be transformed and lit once, as opposed to being transformed and lit once for each triangle to which they belong. Transforming and or lighting may thus be performed on an individual vertex basis instead of on a geometric primitive basis. The individually transformed and lit vertices are then assembled into primitives for rendering.

In some embodiments, the graphics system may utilize a transformed vertex cache to store transformed and lit vertices. Each time a particular vertex is needed to form a geometric primitive, the vertex is read from the transformed vertex cache. Each vertex may be accessed using a tag assigned to the vertex during decompression.

In other embodiments, the graphics system may utilize a transformed vertex buffer that is similar to a mesh buffer in function. However, instead of storing vertices generated by the geometry decompressor, the transformed vertex buffer stores transformed and lit vertices. Mesh buffer references may be used by the transformed vertex buffer to determine which transformed and lit vertices should be stored in the transformed vertex buffer.

BRIEF DESCRIPTION OF THE DRAWINGS

FIG. 4 is one example of a list of vertices forming triangles that describing a three-dimensional object.

FIG. 5 illustrates the reuse of vertices when forming triangles.

FIG. 15A illustrates one method for representing a vertex in object space.

FIG. 15B illustrates one method for representing a vertex in world space.

FIG. 15C illustrates one method for representing a vertex in screen space.

Figure 1:
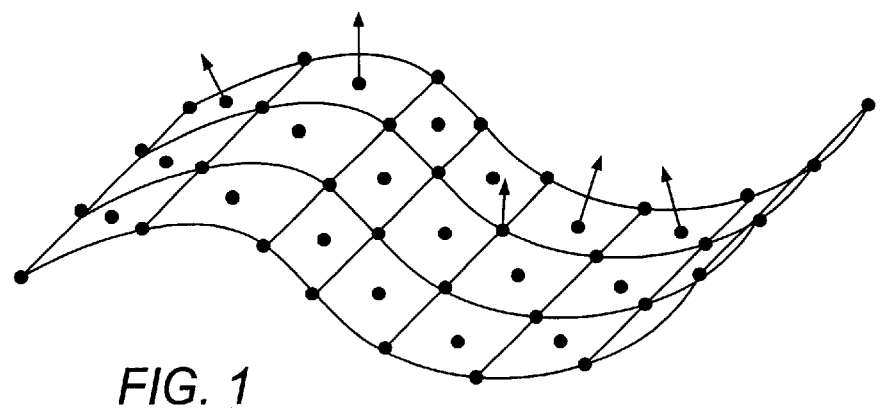
FIG. 1 is an illustration of a three-dimensional object with vertices and surface normals.
Figure 2:
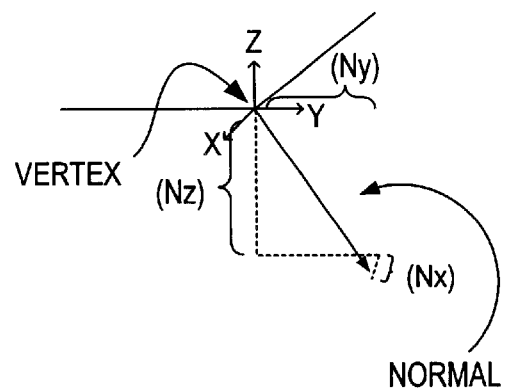
FIG. 2 is an illustration of one type of surface normal.
Figure 3:
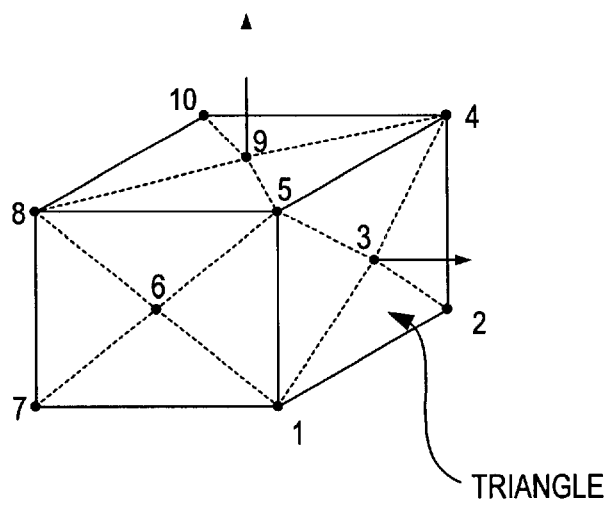
FIG. 3 is an illustration of three-dimensional object that has been tessellated into triangles.
Figure 6:
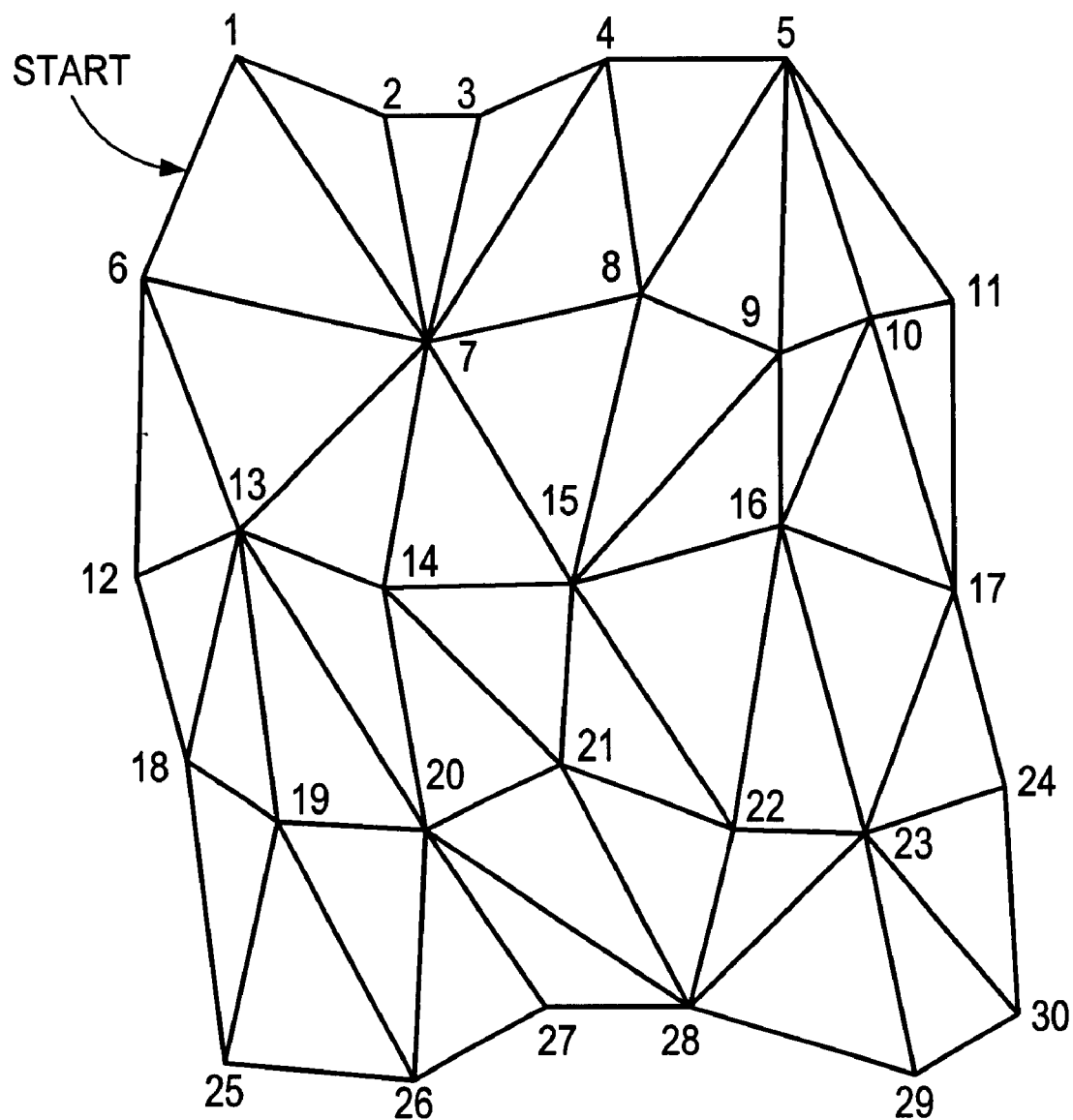
FIG. 6 depicts an example triangle mesh.
Figure 7A:
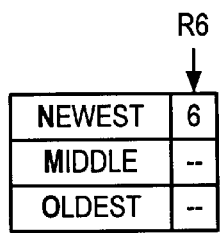
FIGS. 7A–H illustrate one method for decompressing a generalized triangle strip.
Figure 7B:
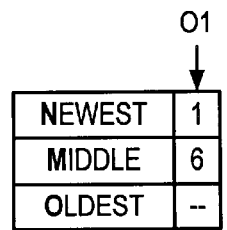
Figure 7C:
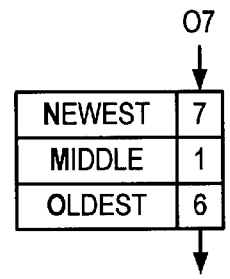
Figure 7D:
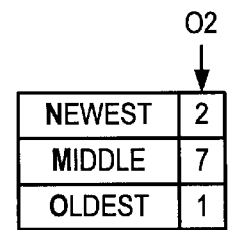
Figure 7E:
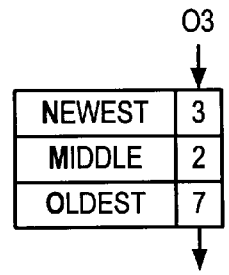
Figure 7F:
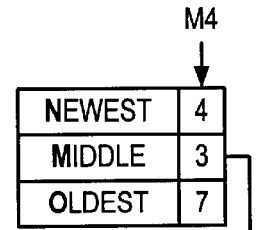
Figure 7G:
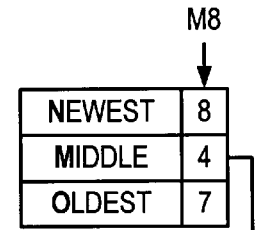
Figure 7H:
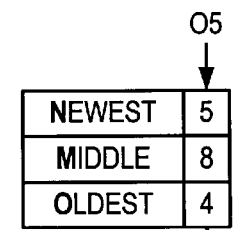

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

A graphics system according to the present invention may be used to achieve improved-performance by reducing redundant processing. Advantageously, compressed geometry data may still be utilized by the system. Before describing the system and related method in detail, the overall environment in which the present invention may be practiced will be described.

Figure 10:
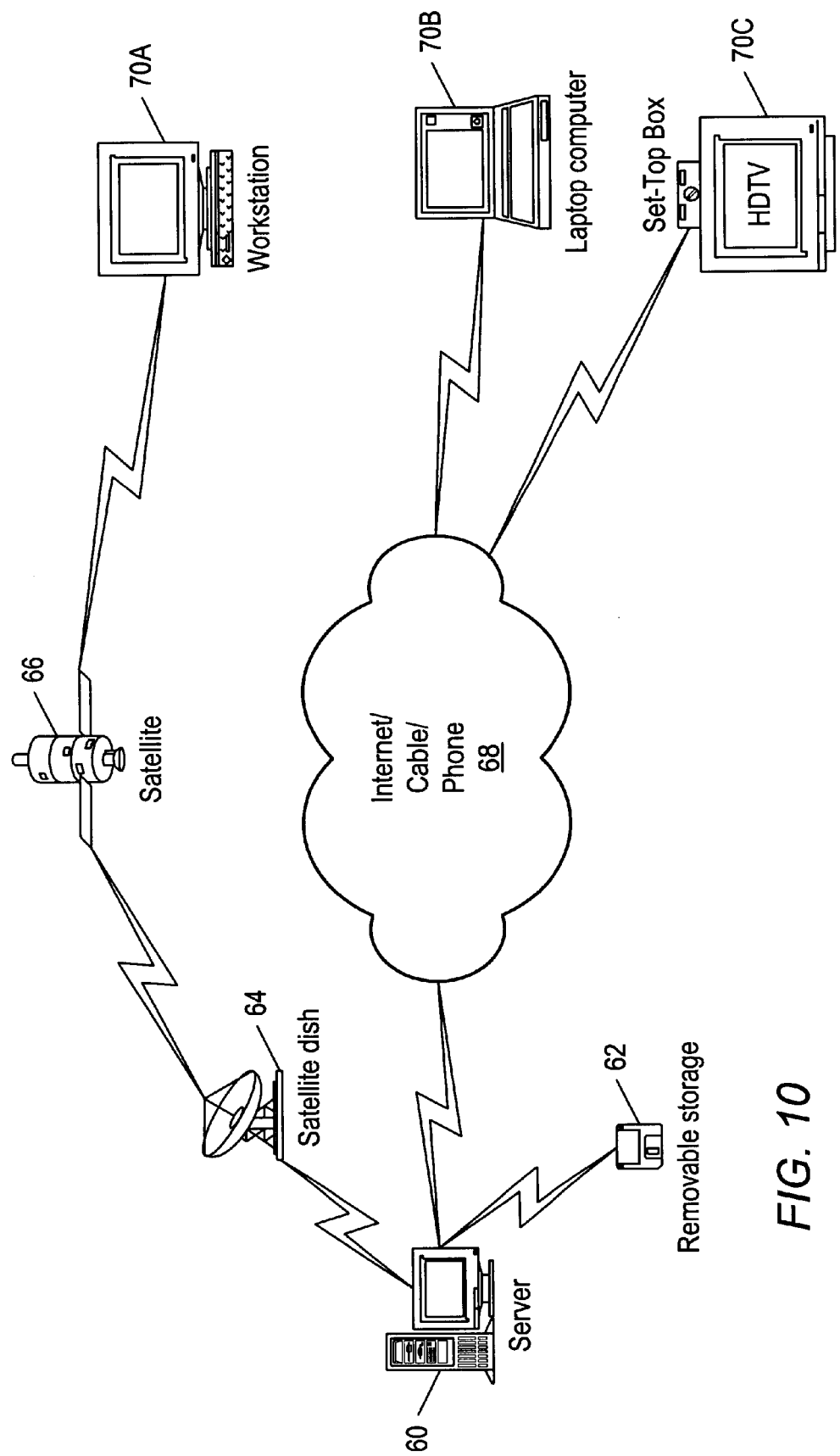
FIG. 10 depicts one embodiment of a computer network.

Computer Network—FIG. 10

FIG. 10 depicts an example computer network. The computer network comprises a server 60 that is configured to convey compressed 3D geometry data to clients 70A–C. In some embodiments, server 60 may generate the compressed 3D geometry data in real time. In other configurations, the 3D geometry data may be generated off line. The compressed 3D geometry data may be conveyed to clients 70A–C in a number of different manners. For example, server 60 may transmit the compressed 3D geometry data via a physical communications network 68. Communications network may include Internet links, cable links, and phone lines. Server 60 may also convey the compressed 3D geometry data using a physical carrier medium 62 (e.g., a CD, DVD, or magnetic medium). Another means for conveying the compressed 3D geometry data may include wireless transmission (e.g., via dish antenna 64 and satellite 66). Combinations of these and other methods may also be utilized.

Once the compressed 3D geometry data is received by one or more of clients 70A–C, the data is decompressed, rendered, and then displayed. As indicated in the figure, clients 70A–C may include computer systems such as personal computers (PCs), laptop computers, network computers (NCs), television sets with "set top" decoder boxes, game boxes, and other electronic devices capable of manipulating and or displaying 3D computer graphics. Other examples include personal digital assistants (PDAs) and virtual reality workstations (e.g., computers having head-mounted displays).

Figure 11:
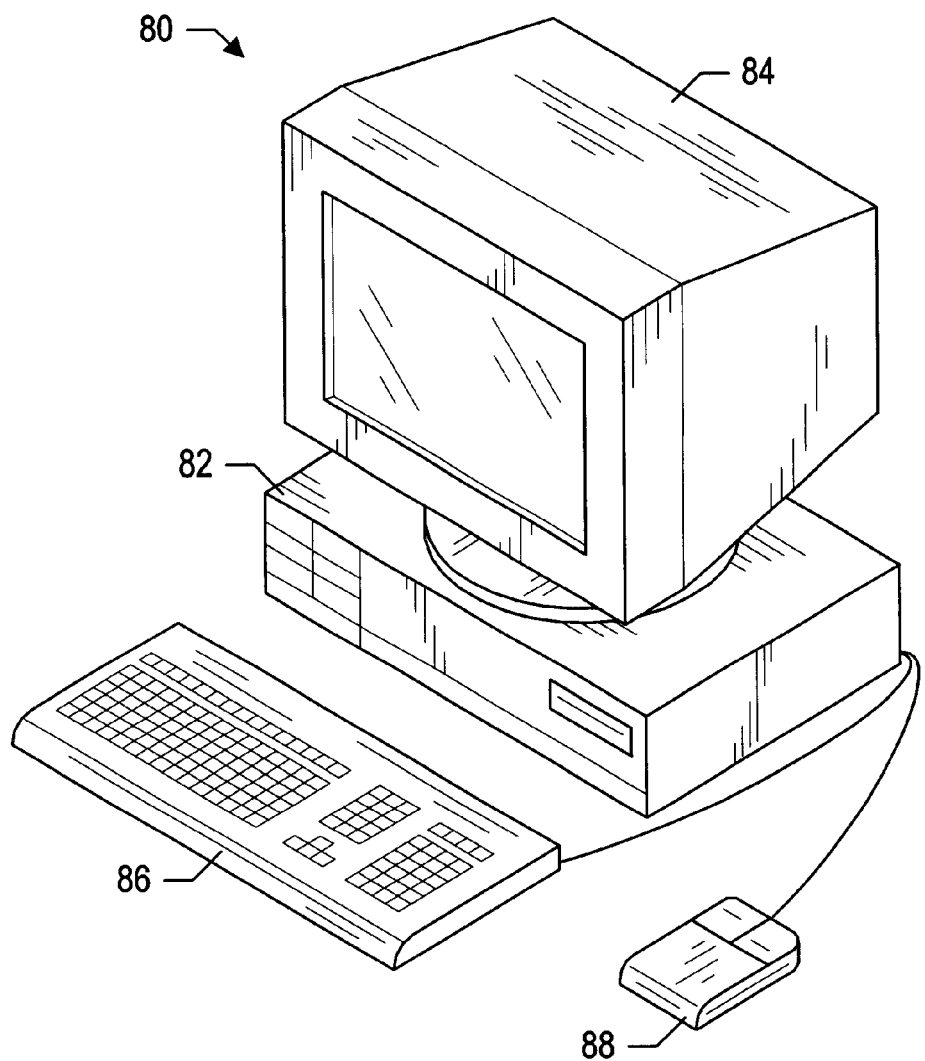
FIG. 11 illustrates one embodiment of a computer system that includes a three-dimensional graphics system.

Computer System—FIG. 11

FIG. 11 illustrates one embodiment of a computer system 80 that includes a three-dimensional (3-D) graphics system. The 3-D graphics system may be comprised in any of various systems, including a computer system, network PC, Internet appliance, a television, including HDTV systems and interactive television systems, personal digital assistants (PDAs), and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, body sensors, etc.). Application software may be executed by the computer system 80 to display 3-D graphical objects on display device 84. As described further below, the 3-D graphics system in computer system 80 includes a super-sampled sample buffer with a programmable real-time sample-to-pixel calculation unit to improve the quality and realism of images displayed on display device 84.

Figure 12:
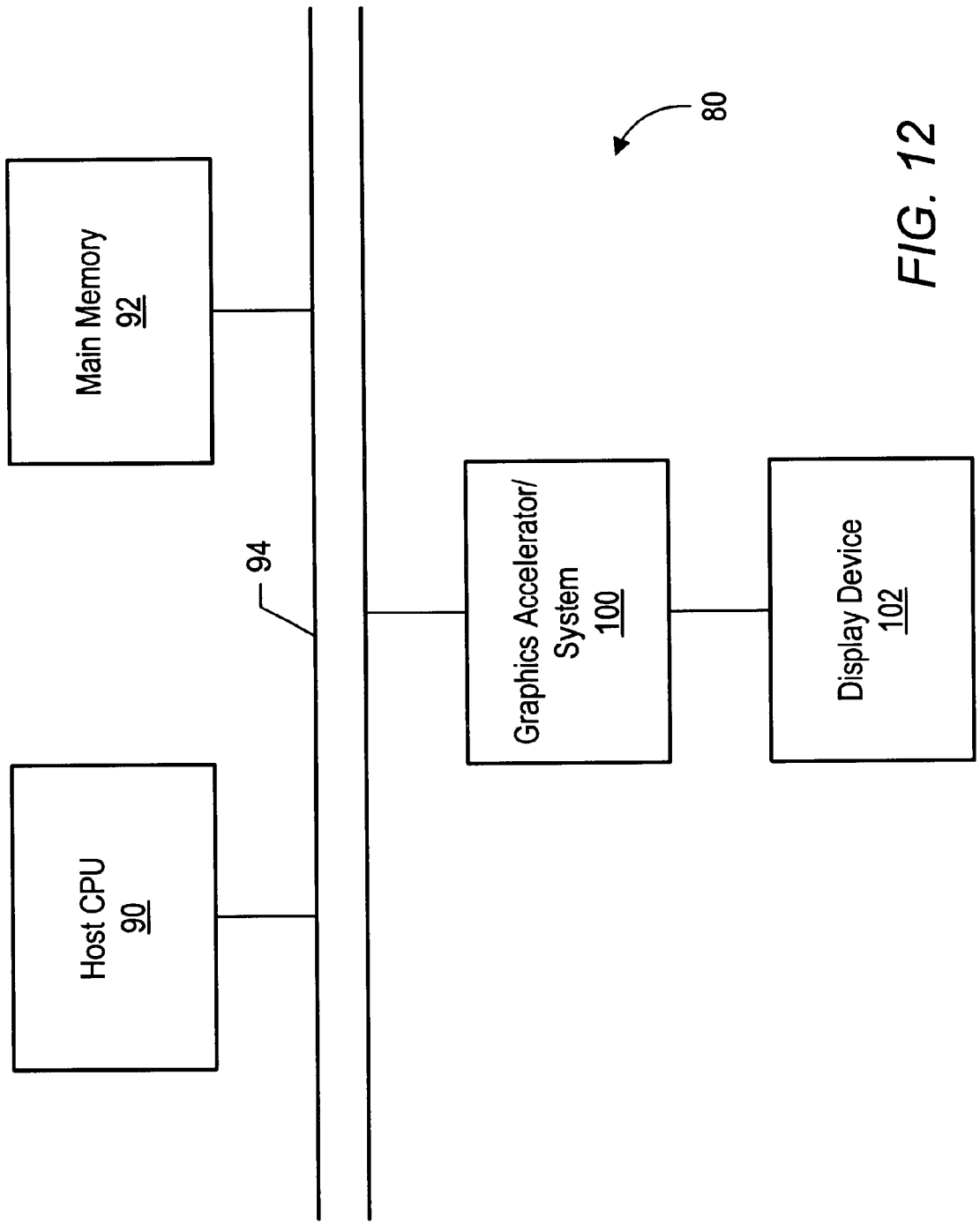
FIG. 12 illustrates a simplified block diagram illustrating one embodiment of the computer system of FIG. 11.

Computer System Block Diagram—FIG. 12

FIG. 12 illustrates a simplified block diagram illustrating the computer system of FIG. 11. Elements of the computer system that are not necessary for an understanding of the present invention are not shown for convenience. As shown, the computer system 80 includes a central processing unit (CPU) 90 coupled to a high-speed memory bus or system bus 94 (also referred to as host bus 94). A system memory 92 may also be coupled to high-speed bus 94.

Host processor 90 may comprise one or more processors of varying types, e.g., microprocessors, multi-processors and CPUs. The system memory 92 may comprise any combination of different types of memory subsystems, including random access memories, (e.g., Static Random Access Memories or "SRAMs", Synchronous Dynamic Random Access Memories or "SDRAMs", and Rambus Dynamic Access Memories or "RDRAM", among others) and mass storage devices. The system bus or host bus 94 may comprise one or more communication or host computer buses (for communication between host processors, CPUs, and memory subsystems) as well as specialized subsystem buses.

A 3-D graphics system or graphics system 100 according to the present invention is coupled to the high-speed bus 94. The 3-D graphics system 100 may be coupled to the bus 94 by, for example, a crossbar switch or other bus connectivity logic. It is assumed that various other peripheral devices, or other buses, may be connected to the high-speed bus 94. It is noted that the 3-D graphics system may be coupled to one or more of the buses in computer system 80 and/or may be coupled to various types of buses. In addition, the 3D graphics system may be coupled to a communication port and thereby directly receive graphics data from an external source, e.g., the Internet or a network. As shown in the figure, display device 84 is connected to the 3-D graphics system 100 comprised in the computer system 80.

Host CPU 90 may transfer information to and from the graphics system 100 according to a programmed input/output (I/O) protocol over host bus 94. Alternately, graphics system 100 may access the memory subsystem 92 according to a direct memory access (DMA) protocol or through intelligent bus mastering.

A graphics application program conforming to an application programming interface (API) such as OpenGL™ or Java 3D™ may execute on host CPU 90 and generate commands and data that define a geometric primitive (graphics data) such as a polygon for output on display device 84. As defined by the particular graphics interface used, these primitives may have separate color properties for the front and back surfaces. Host processor 90 may transfer these graphics data to memory subsystem 92. Thereafter, the host processor 90 may operate to transfer the graphics data to the graphics system 100 over the host bus 94. In another embodiment, the graphics system 100 may read in geometry data arrays over the host bus 94 using DMA access cycles. In yet another embodiment, the graphics system 100 may be coupled to the system memory 92 through a direct port, such as the Advanced Graphics Port (AGP) promulgated by Intel Corporation.

The graphics system may receive graphics data from any of various sources, including the host CPU 90 and/or the system memory 92, other memory, or from an external source such as a network, e.g., the Internet, or from a broadcast medium, e.g., television, or from other sources.

As will be described below, graphics system 100 may be configured to delay geometric primitive assembly so as to reduce or eliminate redundant vertex processing. Note while graphics system 100 is depicted as part of computer system 80, graphics system 100 may also be configured as a stand-alone device (e.g., with its own built-in display). Graphics system 100 may also be configured as a single chip device or as part of a system-on-a-chip or a multi-chip module.

Figure 13:
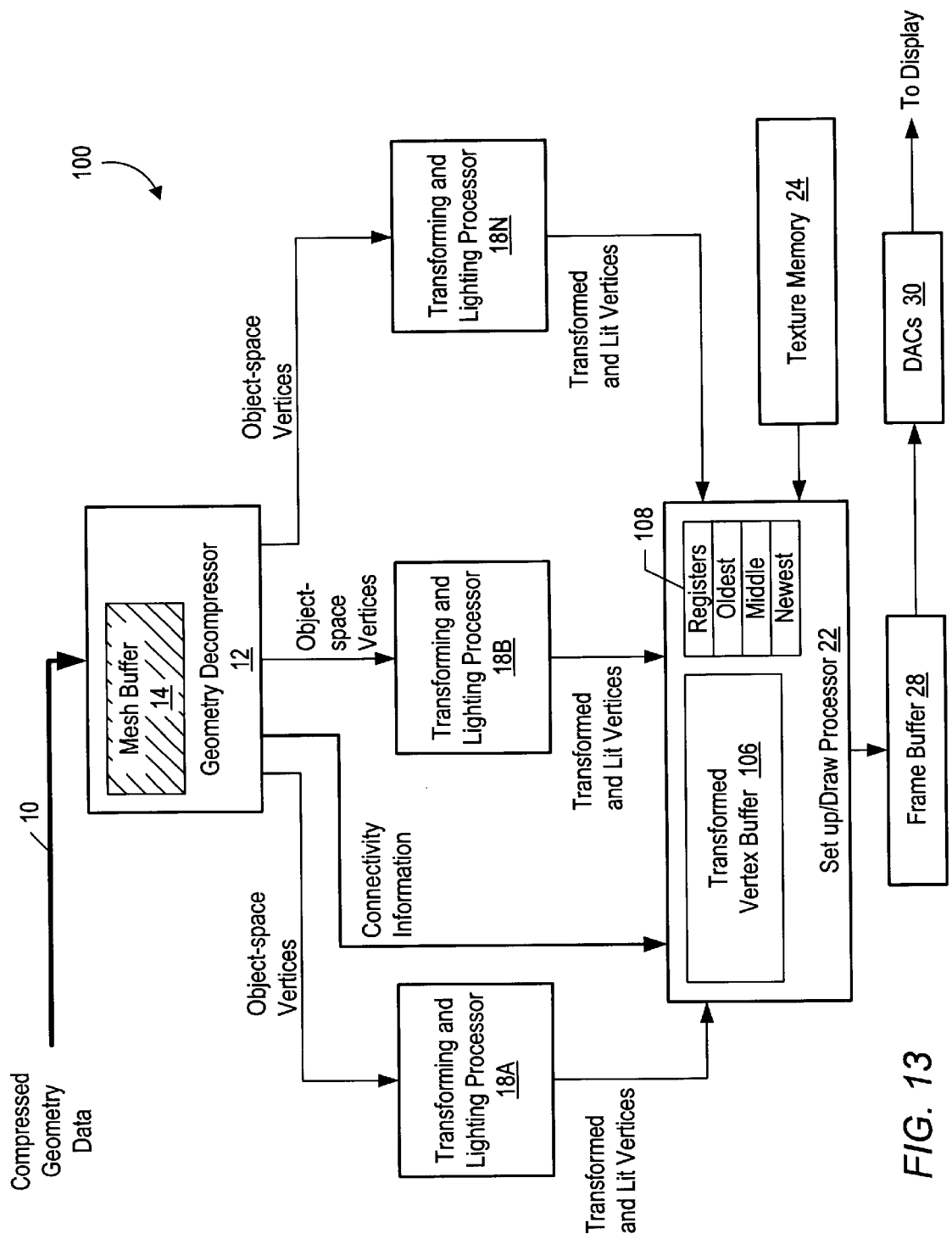
FIG. 13 illustrates one embodiment of the graphics system from FIG. 12.

Graphics System—FIG. 13

FIG. 13 illustrates one embodiment of graphics system 100 that is configured to utilize compressed 3D geometry data and reduce redundant processing of reused vertices. Graphics system 100 receives compressed 3D geometry data from input bus 10. Geometry decompressor 12 receives and decompressed the data into object space vertices. The difference between object-space, world-space, and screen space coordinates and vertices are explained in detail below (see FIG. 15). Note in this embodiment mesh buffer 14 is optional because the vertices need not be assembled into complete geometric primitives within decompressor 12. Instead, in this embodiment the 3D geometry data may be decompressed into two types of information: (1) individual vertices, and (2) connectivity information. As used herein the term "connectivity information" means information that indicates how the vertices are connected together. For example, connectivity information may include mesh buffer references. The connectivity information is routed by decompressor 12 to set up/draw processor 22.

The individual object-space vertices are distributed (e.g., in a load-balancing manner) to transform/lighting processors 18A–N. The transform/lighting processors 18A–N transform the object-space vertices to world space or screen space coordinates, and then perform lighting calculations. The transformed and lit vertices are then conveyed to set up/draw processor 22.

Figure 8A:
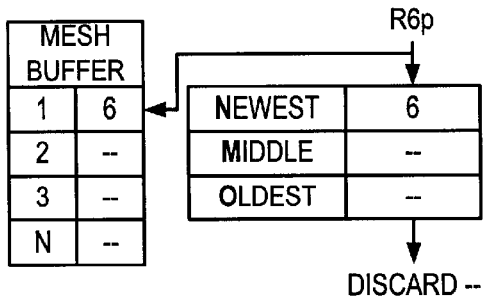
FIGS. 8A–N depict one method for utilizing a mesh buffer to decompress a generalized triangular mesh data structure.
Figure 8E:
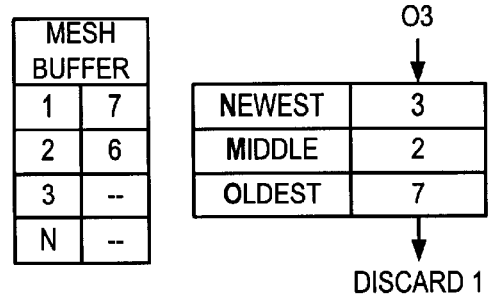
Figure 8B:
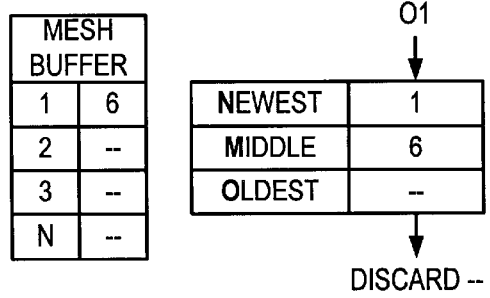
Figure 8F:
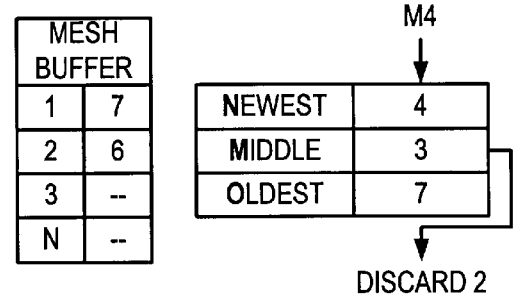
Figure 8C:
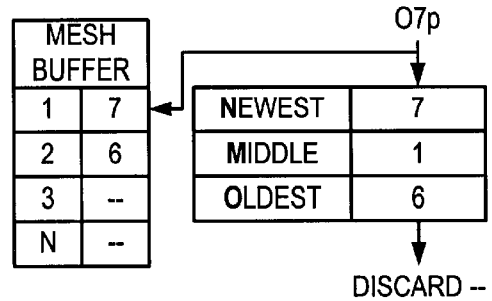
Figure 8G:
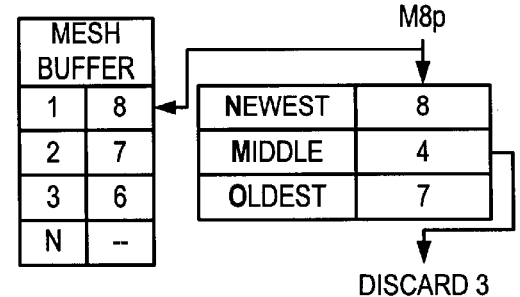
Figure 8D:
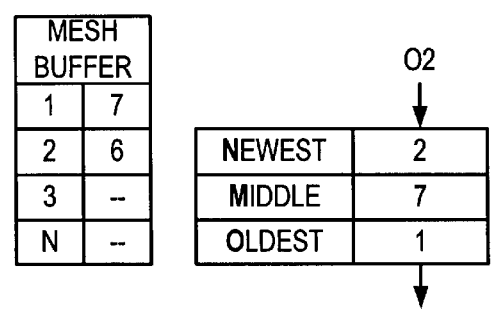
Figure 8H:
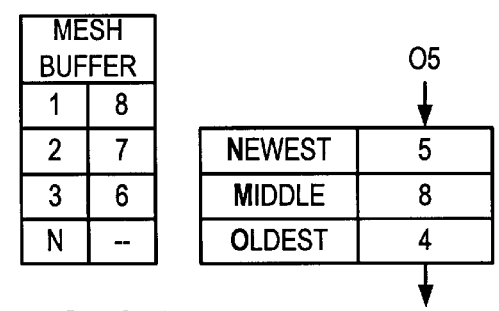
Figure 8I:
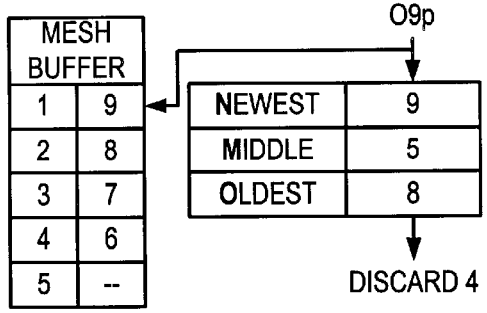
Figure 8M:
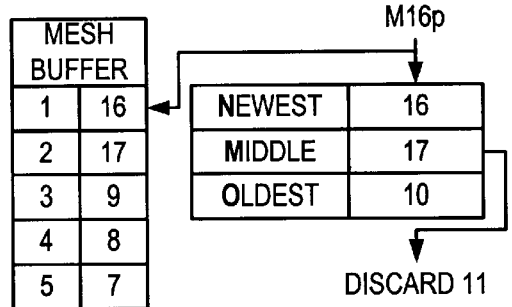
Figure 8J:
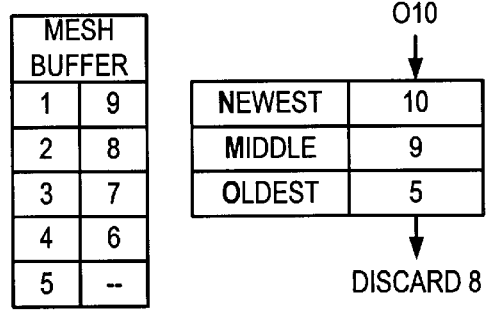
Figure 8N:
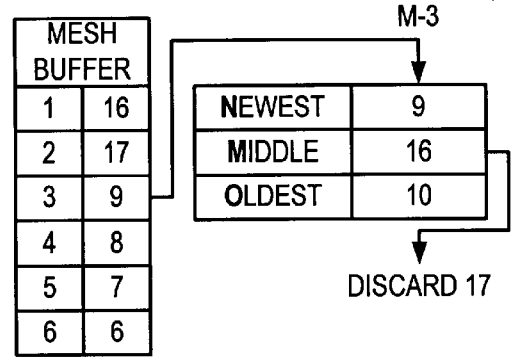
Figure 8K:
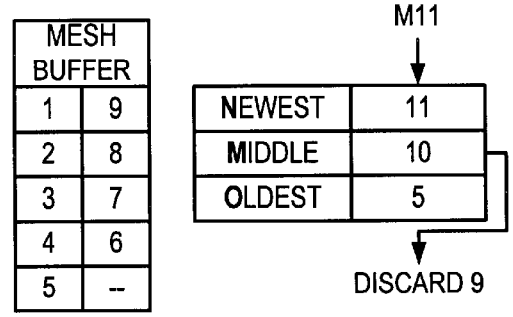
Figure 8L:
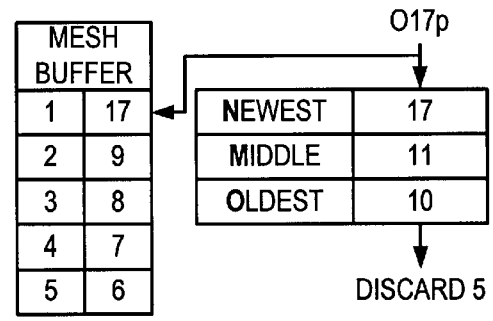
Figure 9:
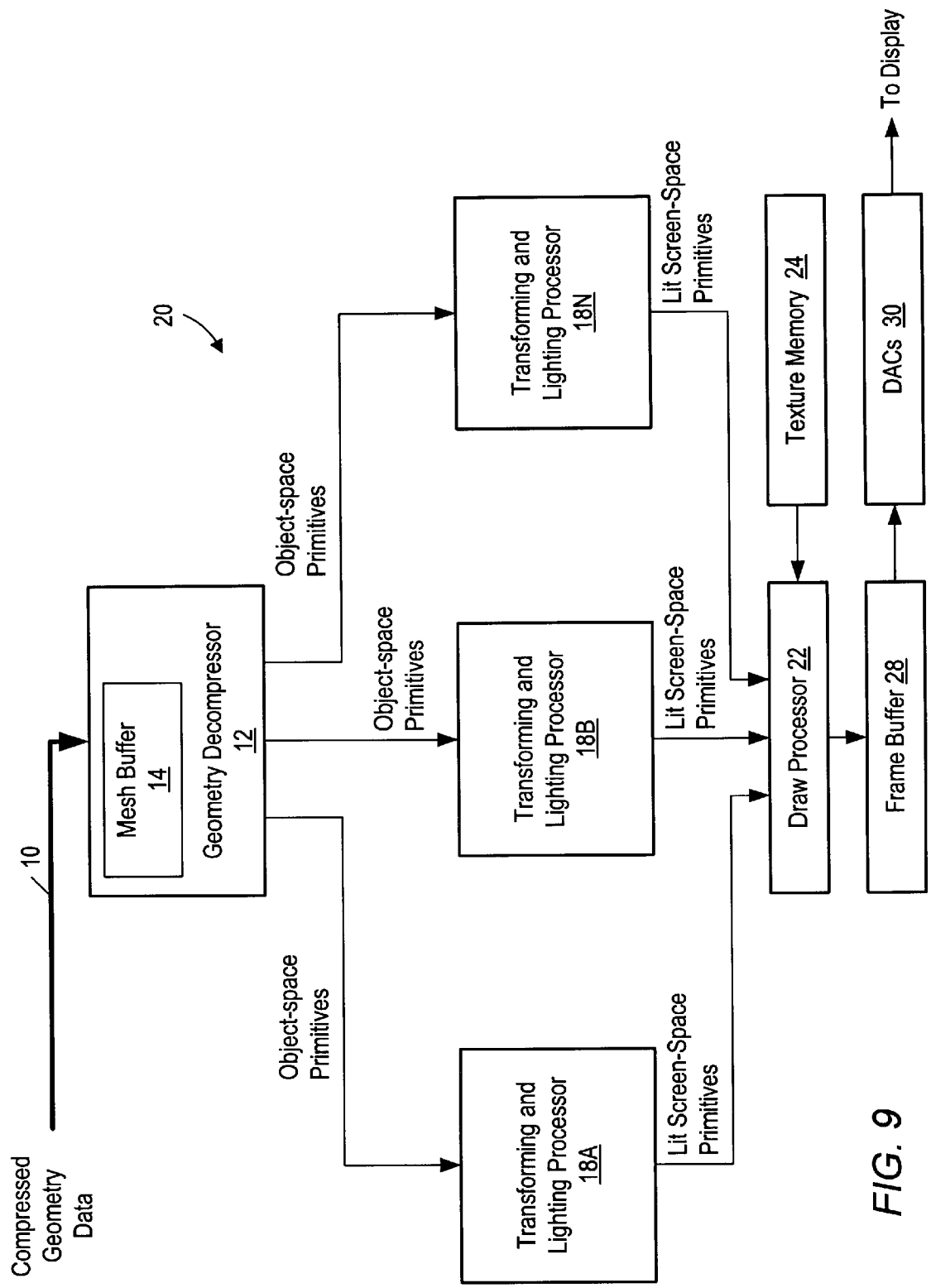
FIG. 9 depicts one embodiment of a graphics system configure to utilize compressed three-dimensional geometry data.

Set up/draw processor 22 is configured to receive both the transformed and lit vertices from processors 18A–N and the connectivity information from geometry decompressor 12. Based on the connectivity information, set up/draw processor 22 is configured to assemble the transformed and lit vertices into geometric primitives. In the embodiment shown in the figure, a transformed vertex buffer 106 may be used by set up/draw processor 22 to assemble the geometric primitives (e.g., using registers 108). Assembly of geometric primitives may be accomplished in a similar manner to that used by geometry decompressor 12 in FIGS. 8A–8N. However, instead of using a mesh buffer, set up/draw processor 22 may utilize transformed vertex buffer 106 to store the transformed and lit vertices according to the connectivity information from decompressor 12. As previously noted, in some embodiments the connectivity information may include mesh buffer references from the compressed 3D geometry data. These mesh buffer references may be used to selectively push and pop transformed and lit vertices onto transformed vertex buffer 106. In this embodiment, transformed vertex buffer 106 may be configured as a stack that is accessible using top-of-stack relative addressing (e.g., as shown in FIG. 8N).

As previously noted, by transforming and lighting vertices individually, redundant transforming and lighting of shared vertices may be reduced. For example, in previous systems if a first triangle having vertices 1-2-3 and a second triangle having vertices 2-3-4 were formed by decompressor 12, transform and lighting processor 18A may have received the first triangle and processor 18B may have received the second triangle. Each processor would have then performed transformation and lighting calculations on each of its triangle's three vertices. Thus processor 18A would have transformed and lit vertices 1, 2, and 3, while processor 18B would have transformed and lit vertices 2, 3, and 4. As this example illustrated, vertices 2, and 3 are transformed and lit twice.

In contrast, in the embodiment illustrated in the figure, vertices 1–3 could have been routed to processor 18A, while vertices 4–6 could have been routed to processor 18B. Thus duplicative transformation and lighting of repeated vertices may be reduced or eliminated. This is possible because in most cases vertices may be treated as independent points on an object's surface. Which vertices neighbor each other is typically irrelevant for coordinate transformation calculations and lighting calculations.

Figure 14:
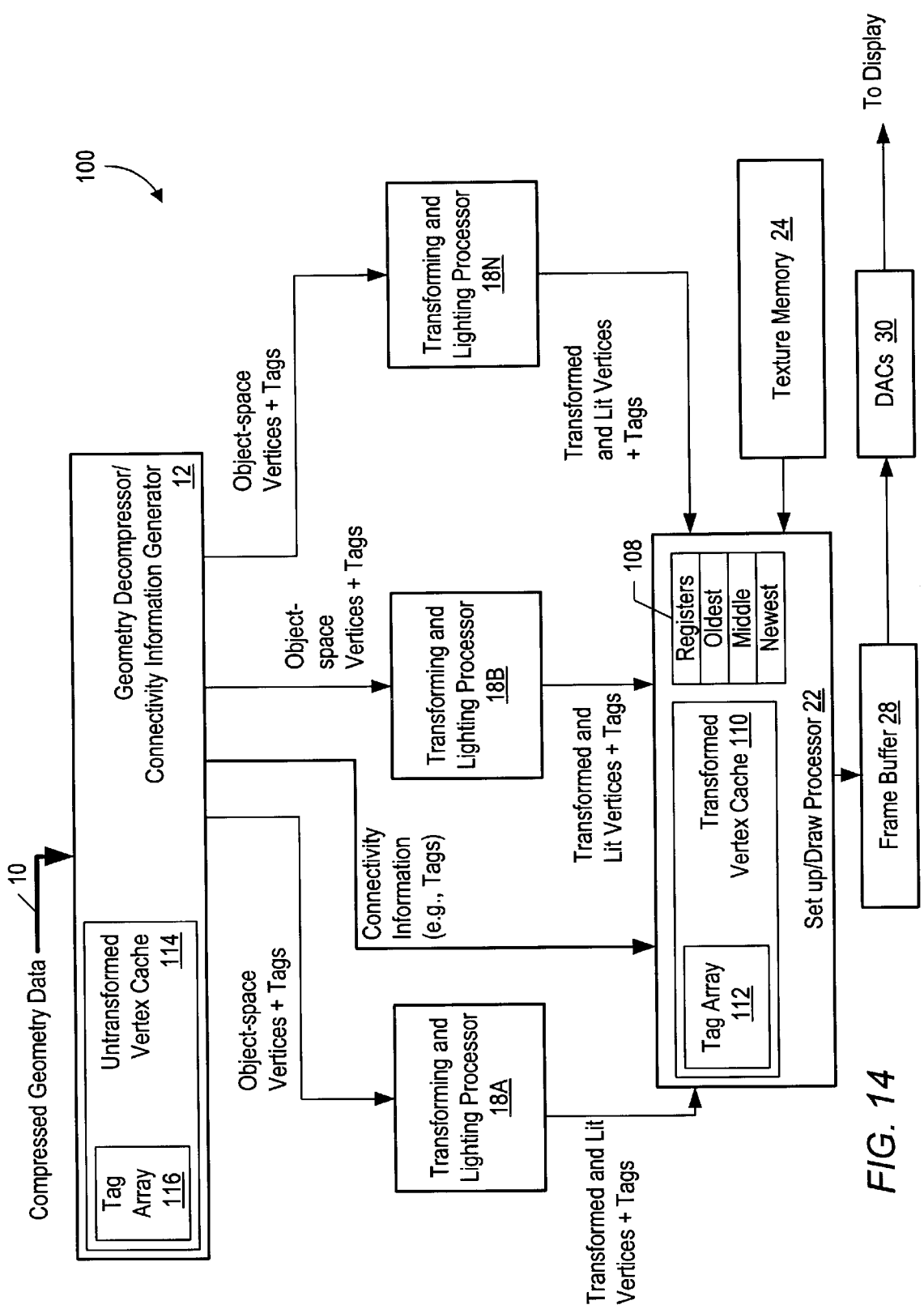
FIG. 14 illustrates one alternative embodiment of the graphics system from FIG. 12.

Alternate Embodiment—FIG. 14

FIG. 14 illustrates an alternate embodiment of graphics system 100. In this embodiment, instead of utilizing a transformed vertex buffer, set up/draw processor 22 instead utilizes a transformed vertex cache 110. As used herein the term "transformed vertex memory" (also referred to as a "processed vertex memory") includes both transformed vertex buffers, transformed vertex caches, and other memory devices configured to store vertices that are have been transformed from their original coordinate reference frame.

The transformed vertex memory may store vertices that have been subjected to one or more of the following processes: model transformation, view transformation, clip testing, perspective transformation, lighting, texturing, shading, or more complex programmable shading or other processes. These processes may be referred to (individually and collectively) as "vertex processes", and a vertex which has had one or more vertex processes performed on it may be referred to as a "processed vertex". Note, details of programmable shading are described in the book entitled "The Renderman Companion A Programmer's Guide to Realistic Computer Graphics" by Steve Upstill, (Addison-Wesley Publishing Co., July 1989, ISBN: 0201508680).

As shown in the figure, decompressor 12 is configured to receive and decompress compressed 3D geometry data into vertices. However, decompressor 12 is also configured to assign a tag to each decompressed vertex. The decompressed vertices are then routed with their tags to transform and lighting processors 18A–N. Decompressor 12 is also configured to generate connectivity information using the vertex tags. As in the previous embodiment, the connectivity information is provided to set up/draw processor 22.

Set-up/draw processor 22 is configured to receive the transformed and lit vertices (and their associated tags) and store them into transformed vertex cache 110 and tag array 112, respectively. Depending upon the configuration, transformed vertex cache 110 may be direct mapped, set-associative, or fully associative. Set up/draw processor 22 then assembles geometric primitives based on the connectivity information provided by decompressor 12. In one embodiment, the connectivity information may comprise a sequences of tags. These tags may be used by set up/draw processor 22 to read the transformed and lit vertices out of cache 110 (using tag array 112) and into register 110. As in the previous embodiment, when a primitive is formed in registers 110, it is then rendered (i.e., drawn) into frame buffer 28. As with the previous embodiment, the amount of redundant processing performed on shared/reused vertices may be reduced. Depending upon the configuration and the size of transformed vertex cache 110, this embodiment may allow reuse of vertices beyond a particular mesh (e.g., beyond the boundaries of a single triangle mesh).

Note that while the figures show registers 108 with storage for only three vertices per primitive, other configurations are also possible (e.g., four or more vertices for polygons, two vertices for lines, or one vertex for dots). Further note that while graphics system 100 is shown as receiving compressed 3D geometry data, other types of data may also be received and used. For example, decompressor 12 may be configured to receive uncompressed 3D geometry data in some embodiments. The 3D graphics data may include data in a number of different formats. For example, three dimensional objects that are part of the scene may be represented as volumes, surfaces, or 3D objects that have been tessellated into a plurality of polygons (e.g., triangles or quadrilaterals). The 3D graphics data may also include objects modeled with NURBs (non-uniform rational B-splines), volume elements, subdivision surfaces, meshes and other techniques. The 3D data may be generated by computer animators, by 3D scanning devices, 3D cameras, 3D digitizers, or other techniques. Depending upon the format in which the 3D graphics data is received, it may be manipulated before being transformed into a plurality of vertices.

In this case decompressor 12 acts more like a connectivity information generator by generating the vertex tags and corresponding connectivity information for the vertices instead of actually decompressing the data. In other embodiments the data may be compressed using non-geometric methods (e.g., numerical compression such as LZW compression). While the bandwidth reduction benefits may not be fully realized in such an embodiment, graphics system 100 may nevertheless be able to reduce the amount of redundant transformation and lighting that is performed on shared/reused vertices To allow decompressor/connectivity information generator 12 to efficiently generate the connectivity information, in one embodiment connectivity information generator 12 may be configured with an untransformed vertex cache 114 and corresponding tag array 116. As decompressor/connectivity information generator 12 receives data, it may assign tags and then store the vertices and their corresponding tags to untransformed vertex cache 114 and tag array 116, respectively. Decompressor/generator 12 may then examine vertices as they are received. If a corresponding entry is already in untransformed vertex cache 114, then the vertex has already been transformed and lit and should be stored in transformed vertex cache 110. Thus, decompressor/generator 12 may convey the tag to set up-draw processor 22 without having the vertex re-transformed. If transformed vertex cache 110 does not have a copy of the transformed vertex, this may be signaled back to decompressor/generator 12 and decompressor/generator 12 may convey the untransformed vertex to one of transform and lighting processors 18A–N.

The size of caches 110 and 114 may vary depending upon the organization of the input graphics data. For example, if the graphics data is highly organized (e.g., into generalized meshes), a smaller cache may contain enough storage to be effective. If however, the graphics data contains random vertices, then a larger cache may be more effective in reducing redundant transform and lighting calculations.

While each embodiment may include different information with vertices stored in transformed vertex buffer 106 (or transformed vertex cache 110), a partial list of information that may be included with some or all of the vertices follows: vertex position (e.g., x,y,z coordinate in world space or screen space), texture mapping coordinates (e.g., 2D coordinates, 3D coordinates, multiple texture map coordinates, 4D coordinates), color (e.g., red, green, and blue components), transparency information (e.g., an alpha component), normal information (e.g., Nx, Ny, Nz), lighting information, displacement map information, reflectivity information, bump map information, blur information, an intensity and brightness information, and other control information.

Note in some embodiments there may be multiple set up/draw processors (e.g., one for each transform and lighting processor or one for every two transform and lighting processors) and multiple decompressor units. These embodiments will be described in greater detail below (see discussion of FIG. 17). However, the transformation calculations performed by transform and lighting processors 18A–N will be described first, as will a method for implementing the previously described embodiments.

Transformation—FIGS. 15A–C

FIG. 15A illustrates a particular point or vertex 150 with relation to a corresponding object's coordinate axes 140. Thus, the position of vertex 150 may be specified by identifying its x, y, and z offset from coordinate axes 140.

FIG. 15B illustrates the same vertex 150, but this time in relation to a "world-space" coordinate axes 142. Note, depending upon the three-dimensional object or scene being described, world coordinate axes 142 need not be on an object. Instead, world coordinate axes 142 may be in world space offset from any objects. To obtain the coordinates of vertex 150 in world space (i.e., relative to world coordinate axes 142), the original object-space coordinates (as shown in FIG. 15A) may be offset by the difference in position of object coordinate axes 140 and world coordinate axes 142.

FIG. 15C illustrates one type of screen space coordinate system. Vertex 150 may be specified in relation to screen coordinate axes 144. Note, in many applications the offset of screen coordinate axes 144 to object coordinate axes 140 is dependent upon the viewer's current position or viewpoint. To obtain the coordinates of vertex 150 in world space (i.e., relative to world coordinate axes 142), the original object-space coordinates (as shown in FIG. 15A) may be offset by the difference in position of world space coordinate axes 142 and screen space coordinate axes 144. The process of translating a particular vertex from object to world space or to screen space is referred to as "transformation". This may be performed by transform and lighting processors 18A–N.

Figure 16:
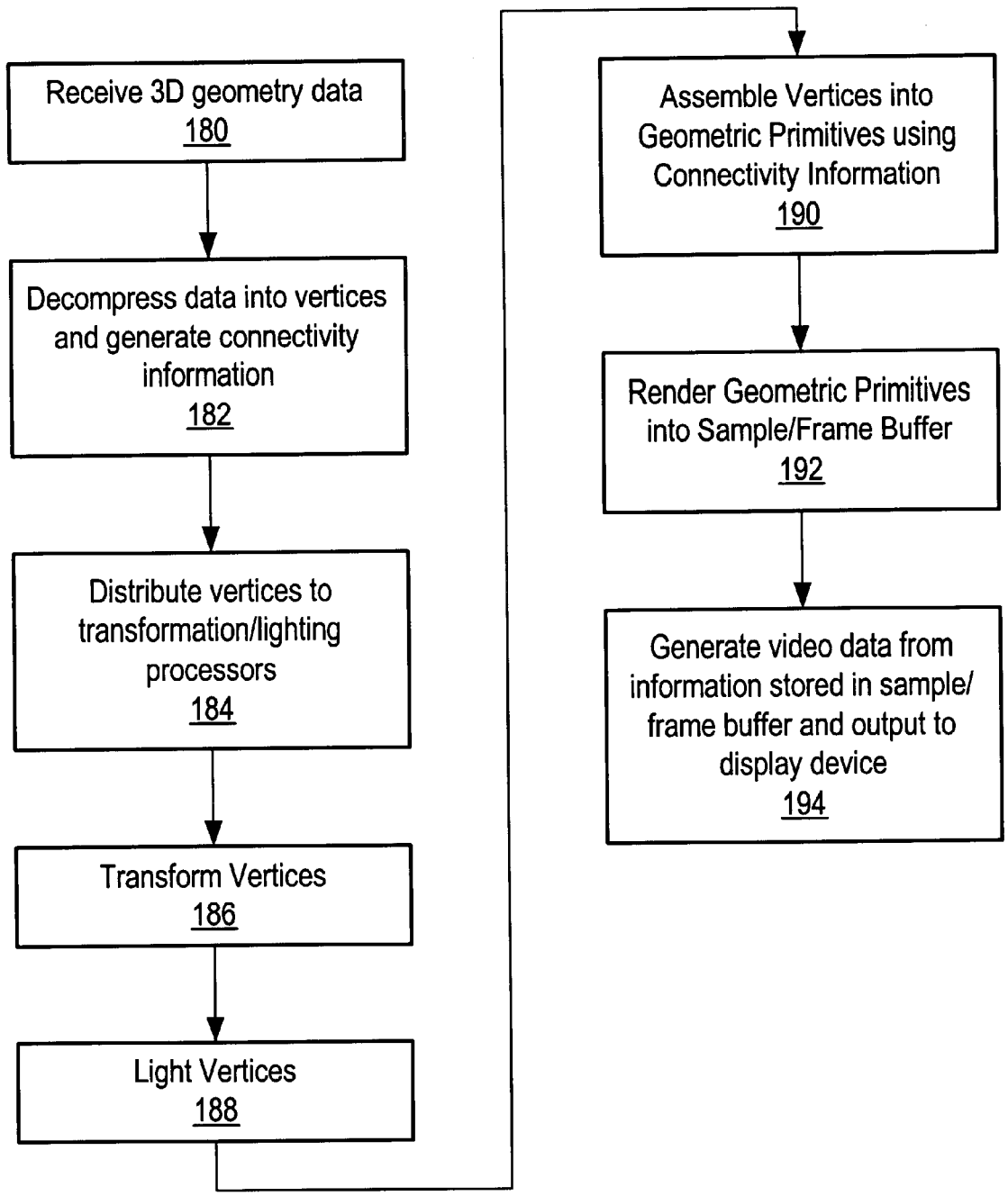
FIG. 16 is a flowchart illustrating one embodiment of a method for reducing redundant transformation and or lighting calculations in a graphics system.

Method For Reducing Redundant Transformation/Lighting—FIG. 16

FIG. 16 is a flowchart illustrating one embodiment of a method to reduce redundant transformation and or lighting calculations performed on shared vertices. As used herein, a shared vertex is one that is part of two or more geometric primitives. Furthermore, as used herein the term "geometric primitive" shall include, but not be limited to, dots, lines, triangles, polygons, volume elements, and surface elements.

First, the geometry data is received by the graphics system (step 180). Next, the geometry data is decompressed into individual vertices and corresponding connectivity information is generated (step 182). As noted above, in some embodiments the geometric data need not be compressed when received by the graphics system. The connectivity information may include mesh buffer-type references, vertex tags, or other schemes for indicating which vertices should be combined to form geometric primitives.

Next, the vertices are distributed to transformation/lighting processors (step 184). In the preferred embodiment, there are multiple transformation and lighting processors configured to work independently and in parallel. The vertices may distributed according to known load balancing techniques to maximize throughput for each processor. Depending upon the implementation, separate processors may handle transformation and lighting. Alternative embodiments may combine transformation, lighting, and texturing in a process called shading. In some embodiments, the graphics system may be configured to perform only transformation (step 186) before assembling the vertices into geometric primitives. In other embodiments, the graphics system may perform both transformation and lighting (step 188) before assembling the vertices into geometric primitives. The vertices are assembled into geometric primitives using the previously generated connectivity information, regardless of whether both transformation and lighting are performed or just transformation (step 190).

Next, the geometric primitives are rendered into a sample or frame buffer (step 192). A sample buffer takes the place of a traditional frame buffer by storing samples in lieu of pixels. The samples are then filtered to form a final pixel value. Use of a sample buffer allows super-sampling, in which the total number of samples is greater than the total number of pixels. Super-sampling has a number of benefits, including a more realistic picture and the capability to perform on-the-fly anti-aliasing. More information on super-sampling is presented in the U.S. patent application Ser. No. 09/251,449, entitled "A Graphics System With Programmable Sample Positions" by Michael F. Deering, David Naegle, and Scott Nelson, filed on Feb. 17, 1999. This application is hereby incorporated by reference in its entirety.

Note that the flowchart depicted in the figure is meant for explanatory purposes and is not meant to be limiting. In some embodiments, the steps may be performed in a different order, in parallel, or some steps may be eliminated (e.g., step 188 or step 194). Additional steps may also be performed. For example, multiple transformation steps 186 may be performed to translate the vertices from object space to world space and from world space to screen space. Furthermore, multiple iterations through lighting step 188 may be performed if multiple light sources are activated. Other graphics processes may also be performed (e.g., texture mapping, bump mapping, displacement mapping, shadowing, specular highlighting, fogging, etc.).

Figure 17:
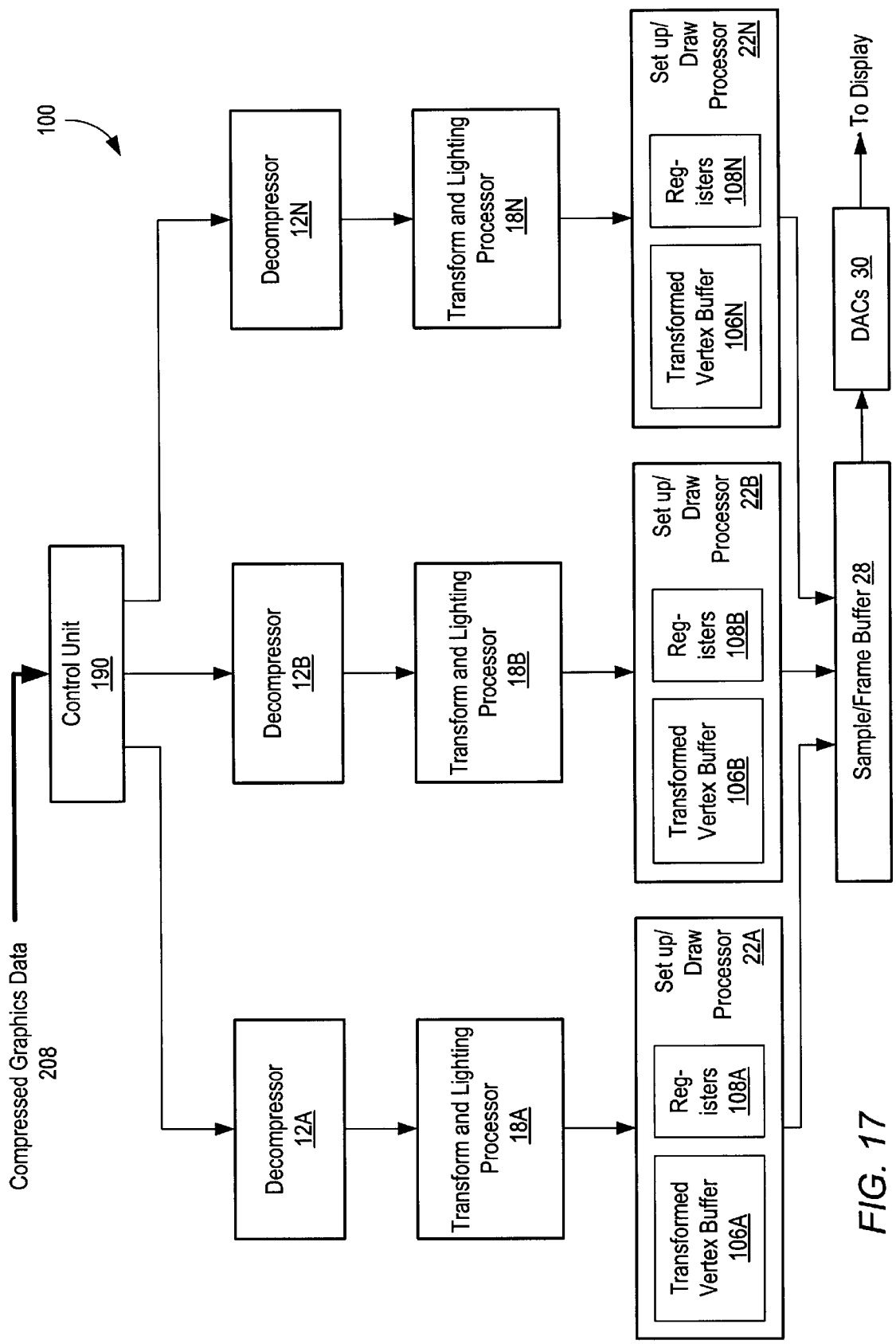
FIG. 17 is a diagram illustrating another embodiment of the graphics system from FIG. 12.

Multiple Graphics Subsystems—FIG. 17

FIG. 17 is a diagram illustrating another embodiment of graphics system 100. In this embodiment, graphics system 100 comprises a control unit 190 that is configured to receive compressed geometry data 208 (e.g., from host CPU 90 in FIG. 12) and route the compressed geometry data to one or more of decompressors 12A–N. Decompressors 12A–N are configured to receive and decompress the compressed geometry data. The decompressed geometry data, which includes one or more vertices, is then conveyed to transform and lighting processors 18A–18N. Note, each corresponding pair of decompressors and transform and lighting units may be referred to herein as a "decompression/render pipeline".

Once the vertices are transformed and lit, they are conveyed to set up/draw units 22A–N. In this embodiment, each set up/draw unit 22A–N has its own transformed vertex buffer 106A–N and its own set of oldest-middle-newest registers 108A–N. These may function similarly to those described in connection with FIG. 14 above. FIFO (First-In First-Out) memories may be utilized in the pipelines (e.g., between control unit 190 and decompression units 12A–N) to buffer the data being distributed by control unit 190.

To control the transform and lighting process and the set up/draw process, compressed graphics data 208 may include predefined control information. Some of this control information may be utilized during the decompression process. For example, compressed graphics data 208 may include control information indicating the type of compression used or specific information about the particular mesh that is compressed. One such type of control information may be an indication of the color depth being used in the particular mesh. Another type of control information may be an indication as to whether color information is specified for each vertex (i.e., a bundle color bit) or whether color information is defined separately (e.g., one global color for all vertices in the mesh). Other control information (e.g., transparency or alpha information) may also be embedded in the compressed geometry data.

The control information may set the "state" of a state machine within one or more of decompressors 12A–N, transform/lighting processors 18A–N, and/or set up/draw processors 22A–N. In some embodiments, the control information may be designated as either "global" or "local" control (or state) information. The control information is global if it is intended to affect the state of all decompressors 12A–N, all transform/lighting processors 18A–N, or all set up/draw processors 22A–N in graphics system 100. Conversely, if the control information is intended to only affect the state of a single decompressor, transform/lighting unit, or set up/draw unit, then the control information is local. Control unit 190 may be configured to detect whether the control information embedded in the stream of compressed geometry data is global or local, and then route the control information accordingly. For example, if a certain set of control information is global, then control unit 190 may be configured to send copies of the control information to each decompression/render pipeline in graphics system 100. If control unit 190 determines that the control information is local, control unit 190 conveys the control information to a single decompression/render pipeline along with the vertex or vertices that are associated with the control information.

For example, control unit 190 may receive a stream of compressed graphics data 208 that begins with a global set color instruction. Control unit 190 may then convey this global control information to each of decompressors 12A–12N. Then control unit 190 may pass compressed vertices in round-robin fashion to decompressors 12A–N. After each vertex is decompressed, each vertex is assigned the global color. If control unit 190 then detects a second global set color instruction with a new color, control unit 190 again sends copies of the instruction to each decompressor, which proceed to assign the new color to all vertices they receive after the global change color instruction.

In some embodiments, control unit 190 may be configured to invalidate the contents of transformed vertex buffers 106A–N in response to detecting a global control instruction. This may prevent a vertex that is reused with different colors from being rendered more than once with the same color. Note, while color and transparency are used in the examples above, other types of local and control information are also possible and contemplated. In some embodiments, the designation of whether the state/control information is global or local may be accomplished through the use of a unicast/multicast bit within compressed graphics data 208, as described in greater detail below.

Figure 18:
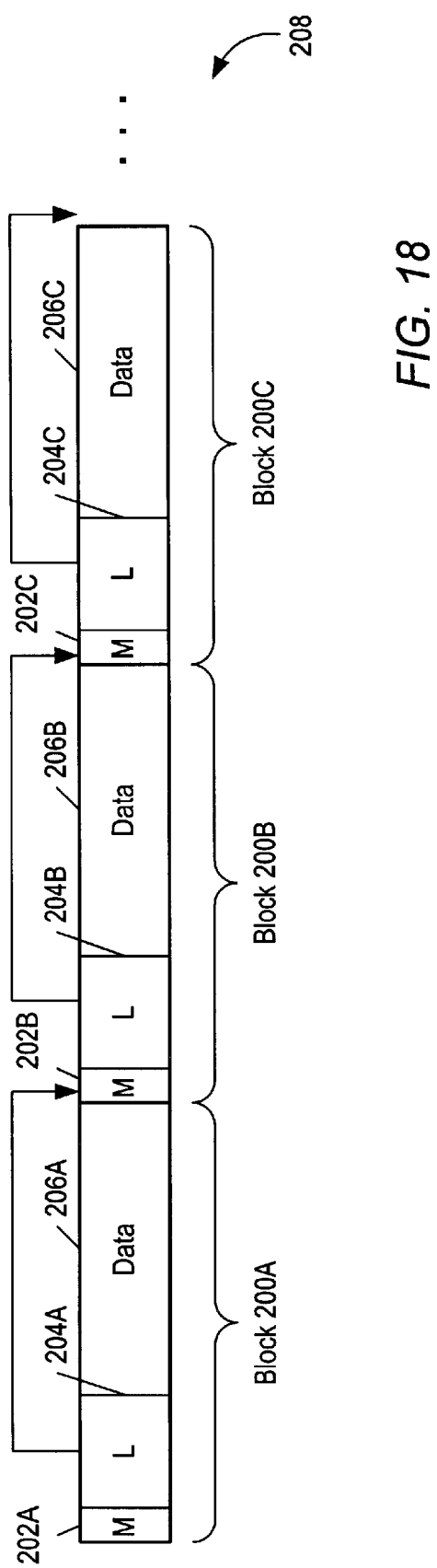
FIG. 18 is a diagram illustrating one embodiment of a data sequence that may be utilized with a graphics system configured to perform parallel decompression of compressed 3D geometry data.

Unicast/Multicast—FIG. 18

FIG. 18 is a diagram illustrating one embodiment of a data sequence 208 that may be utilized with a graphics system configured to perform parallel decompression of compressed 3D geometry data. In this embodiment, data sequence 208 comprises a stream of data blocks 200A–C. Each data block includes a multicast bit 202, a length indicator 204, and a data portion 206. Multicast bit 202 indicates whether the block is a unicast block or a multicast block. Unicast blocks are conveyed to a single decompression/render pipeline. Multicast blocks, however, are conveyed to all decompressor/render pipelines in the graphics system. Length indicators 204 each hold a value that indicates where the next block in the data sequence begins. A number of different length encoding schemes may be used. For example, in one embodiment blocks 200 are aligned to 32-bit word boundaries. Thus, length indicators 204 may store a value indicative of the number of 32-bit words until the start of the next block. In some embodiments the length indicators may be the total length of the current block (in 32-bit words). In other embodiments, the length indicators may indicate the length the following data portion 206 (either in bits, bytes, or words). Length indicators 204 may preferably have a fixed length, or they may be variable length with a prefix that indicates the length of the length indicator 204 itself. Data portion 206 is configured to store compressed 3D geometry data (as well as other information, in certain embodiments). In some embodiments, the length of data portions 206 may be limited to a predetermined maximum (e.g., 2k bytes or 512 32-bit words). In such an embodiment, the maximum length of length indicators 204 may be limited to 9-bits, assuming a 32-bit word length. Other maximum lengths may also be used. Furthermore, as previously noted, by using a variable-length length indicator 204, data portion 206 may not have a maximum length. Note the configuration illustrated in the figure is for explanatory purposes only and is not meant to be limiting. For example, multicast bit 202 may be lengthened to several bits to include additional information.

Data portions 206 may store compressed geometry data corresponding to predetermined mesh size. For example, data portions may be configured to each store compressed geometry information corresponding to a 16×16 mesh of vertices as previously noted, each vertex may comprise varying amounts of information, including xyz position, color information, normal information, texture mapping information, and other vertex component information.

Using data sequence 208, control unit 190 (see FIG. 17) may be configured to efficiently route each block according to multicast bits 202 and length indicators 204A. Length indicators 204 enable control unit 190 to determine block boundaries. For each block received by control unit 190, the corresponding multicast bit 202 directs control unit 190 to convey a block to a single decompression/render pipeline (unicast) or all decompression/render pipelines (multicast). For unicast blocks, control unit 190 may be configured to route the block to the decompression/render pipeline with the least processing backlog (e.g., to the pipeline that most likely is available). While this configuration provides a great deal of flexibility, in some embodiments certain restrictions may be placed upon the format of data sequence 208 to simplify the hardware of control unit 190 and graphics system 100 (e.g., by reducing or eliminating the need of independent decompress/render pipelines having to communicate and/or coordinate with each other).

One such restriction is that only state information may be stored in the data portion 206 of a block 200 that is multicast. Without this restriction, multiple pipelines may spend time decompressing and rendering the same geometry data. Instead, multicast blocks are limited to having "state" information. As used herein state information means information that is being set solely for use with future vertices. As previously noted, some state information (e.g., color and normal information) may be set for a particular vertex of mesh and then reused from one vertex to the next. If all vertices in a particular mesh have the same color, then the color information may be sent once (e.g., with a Java 3D™ compressed geometry setColor instruction) as state information and then reused by some or all of the vertices in the following block or blocks. Other state information may include transparency information and normal information. Depending upon the configuration, other types of state information may also be specified. Thus, a multicast block may serve to reset all decompression/rendering pipelines to a predetermined state. This may be useful when control unit 190 receives blocks that begin a new 3D object. While information stored in the mesh buffer is also state information, as previously noted each block may be forced not to rely on any previously entered mesh buffer information.

Similarly, if a block is designated as a unicast block, to reduce interdependence between the decompress/render pipelines, the block may be limited to geometry information rather than "state" information. As used herein geometry information means any information that does not carry forward from one block to another. For example, mesh buffer contents, vertex.position information, and color information may all be considered geometry information (depending upon the exact implementation of graphics system 100).

Another possible restriction that may be used to prevent any vertices within a block from relying upon any previous information supplied in a previous block is to require that the first vertex of each block be accompanied by a restart tag. As previously explained in the background section, a restart tag is a tag that indicates that a new mesh is starting. The restart tag may be used to indicate to the set up/draw processor that all previous entries in registers 108 and or transformed vertex memory 106 should be invalidated (within the corresponding decompression/render pipeline).

The use of delta encoding or delta-delta encoding of vertex component information may also be restricted. For example, some embodiments of graphics system 100 may be configured to encode the color of a second vertex as an offset relative to a first vertex. Similarly, the position of second vertex may be specified as an offset relative to first vertex. This type of delta or delta-delta encoding is useful because in many cases neighboring vertices may have similar attributes. For example, neighboring vertices will typically have xyz position coordinates that are relatively similar. Thus, instead of specifying an entire position for the second vertex (e.g., 32-bits each for x, y, and z) a simple offset (e.g., 8-bits each for x, y, and z) may be used. However, this type of decoding may complicate control unit 190. For this reasons, some embodiments of graphics system 100 may force the first vertex in a block.to be explicit (e.g., 32-bits of position information for each x, y, and z). Delta encoding may thus be limited to vertices occurring after the first vertex in each block. Similarly, Delta-delta encoding may be limited to vertices occurring after the second vertex in each block. Depending upon the compressed data and the exact implementation of the graphics system, this restriction may not be terribly burdensome because vertices from different blocks (i.e., different meshes) may have greater likelihood of having less in common than vertices from the same block/mesh.

Still another such restriction is that vertices in a particular data portion 206 may not use mesh buffer state information from a previous block. This restriction promotes the independence of each block and may free control unit 190 from having to route the blocks in a particular manner.

One option for implementing graphics system 100 is to guarantee that any multicast block will be seen by every decompress/render pipeline before any subsequent blocks in data sequence 208. For example, if block 200A is first block in data sequence 208, the data may be encoded such that block 200B is a multicast block. If so, then block 200C may be encoded to rely upon the state-setting information contained in block 200B.

This optional restriction may once again simplify control unit 190. To implement this restriction, each decompress/render pipeline may be limited to executing that blocks that it receives in an "in-order" fashion. For example, if each pipeline has a buffer to store pending blocks, the pipeline may be forced to read from the buffer in a FIFO manner. Out-of-order processing within a particular pipeline would not be allowed in this embodiment.

Similarly, some embodiments of graphics system 100 may guarantee that any blocks preceding a multicast block will be executed before the multicast block is executed (within a particular pipeline). This may be implemented in the same manner described above (i.e., by forcing each pipeline to execute blocks it receives in the order in which they are received).

Depending upon the implementation and the amount of complexity within control unit 190 that is acceptable, restrictions are also possible on other types of state information. Examples include limitations on the block-to-block propagation of color information (e.g., set by Java 3D setColor instructions), bundling information (e.g., set by Java 3D bundling instructions), or Huffinan table settings. In some embodiments, the geometry compression used may rely upon programmable Huffinan tables for decompression. The tables may be loaded by Java 3D setTable instructions. After the decompression table is set, each following vertex and or primitive may be decoded utilizing the table;

The aforementioned restrictions may be programmed into a geometry compression program (or dedicated geometry compression hardware) that follows the restrictions when creating the compressed 3D geometry data. Similarly, the requirements above may be programmed into a load-timer verifier that is run as part of the decompression process. Before decompression begins, the load-time verifier may examine the data to determine which, if any of the requirements have been violated.

Graphics system 100 may be optimized to support a particular set of compression requirement. However, if data that does not comply with the particular compression requirements is received, in some embodiments graphics system 100 may still be configured to decompress the data (albeit at a less than optimal rate). For example, in a worst-case scenario all of the blocks may be routed in-order to a single decompress/render pipeline. While slow, this method may still allow accurate decompression and rendering of some types of compressed 3D geometry data that fail to meet all of the restrictions.

Figure 19A:
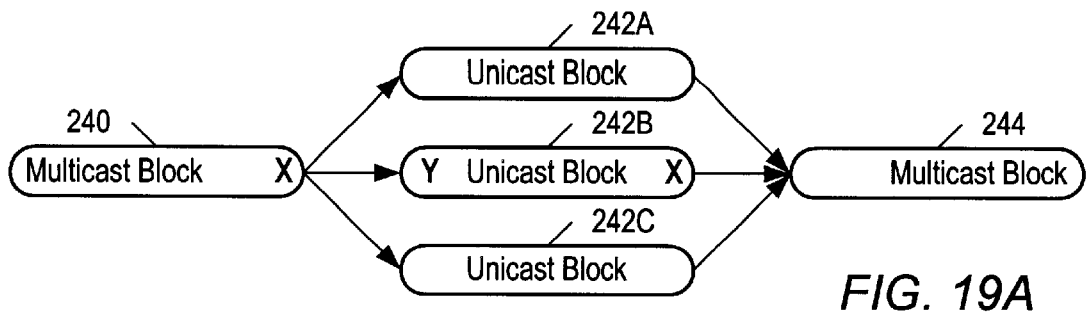
FIG. 19A illustrates the parallel execution of a sequence of blocks.
Figure 19B:
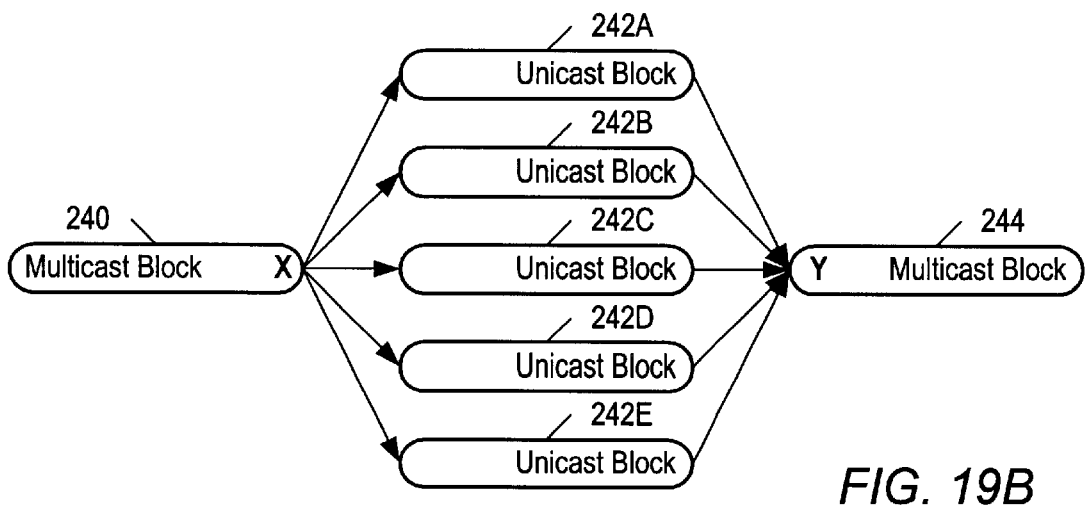
FIG. 19B illustrates how multicast instructions may reduce overall efficiency in some systems with many pipelines.
Figure 19C:
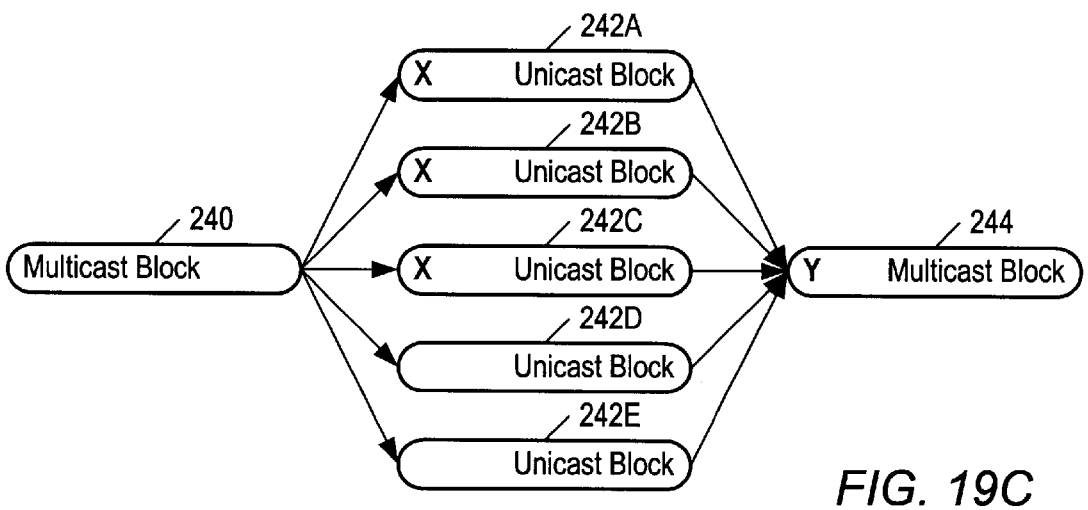
FIG. 19C illustrates how moving the state-setting instruction into the unicast instructions prevents the pipelines that execute unicast blocks 242D–E from having to execute the unnecessary state-setting instruction.

Live-Dead Analysis—FIGS. 19A–C

During the compression process, the compression program/hardware may be configured to perform a live-dead analysis to ensure that the geometry is compressed correctly. This may also be performed in a verifier (i.e., a program that checks the compressed geometry data for compliance with a standard or predefined set of rules). The verifier may be run at compression-time and or at load time. The use of live-dead analysis may allow the compressor to achieve greater compression ratios. In some embodiments, particularly if there are a large number of decompress/render pipelines, the unicast/multicast implementation described above may reduce efficiency to some extent. For example, if one out of every five blocks is a multicast block, and if there are six decompress/render pipelines, then some pipelines may spend an undesirable amount of time processing multicast blocks. To address this, the compressor or verifier may be configured to determine whether a particular pipeline needs to see a particular multicast block. In some embodiments, this information may be encoded as a set of "live-dead" bits (e.g., at the beginning of each block in addition to the multicast bit). Control unit 190 may be configured to detect these live-dead bits for each block and then route the blocks accordingly. In other embodiments, the compressor may be configured to rearrange and or change global instructions to local instructions.

For example, if a global color change to red is followed by two vertices and then a global color change to green, then the global color change to red may be changed to two local color changes to red (i.e., one for each vertex following the global color change to red). Since the global color change to green follows so closely, local color changes will be more efficient in systems with more than two decompression/render pipelines.

FIGS. 19A–C graphically illustrate the process of live-dead analysis using network flow diagrams. FIG. 19A illustrates the parallel execution of a sequence of blocks that were originally in the following order: multicast block 240, unicast block 242A, unicast block 242B, unicast block 242C, and multicast block 244. Assuming multicast block 240 sets a particular portion of state information (e.g., color) to a value X, multicast block 244 may rely upon that state information not having been changed when it executed. Normally, if subsequent blocks rely upon state information set by previous blocks, intervening blocks would not be allowed to change the state information. However, in some embodiments the geometry data may be compressed to allow intervening blocks to temporarily change the state information. This is shown by unicast block 242B, which changes the state information from value X to value Y.

In many embodiments, however, the geometry may be compressed independent of the target hardware's exact configuration. For example, the compression program may be unaware of the number of decompress/render pipelines present in the target hardware. The number of pipelines may vary from system to system depending upon their configuration. Thus, to ensure that multicast block 244 executes correctly (i.e., has the proper state information), unicast block 242B returns the altered state information back to its original state. This is useful in embodiments in which there are multiple decompress/render pipelines, each operating independently and each having its own internal copy of the state information. Thus one pipeline may temporarily operate using different state information. When a particular piece of state information will be relied upon by future blocks, that state information is considered to be "live" state information. However, once a particular setting of state information is no longer needed, it is considered "dead". Dead state information may be changed by subsequent unicast or multicast blocks without having to return the state information back to its original state.

FIG. 19B illustrates how multicast instructions may reduce overall efficiency in some systems with many pipelines. Assuming there are five pipelines in the system, using a multicast block 240 to set a particular portion of the state information to a value X, each of the five pipelines will have to execute the instruction. However, if only the first three unicast instructions (242A–C) rely upon that piece of state information, the final two pipelines executing unicast blocks 242D–E waste time executing the state setting instruction from multicast block 240.

In contrast, FIG. 19C illustrates how moving the state-setting instruction into the unicast instructions prevents the pipelines that execute unicast blocks 242D–E from having to execute the unnecessary state-setting instruction. By performing live-dead analysis, the compressed geometry data may thus be further optimized.

Figures 20A, 20B:
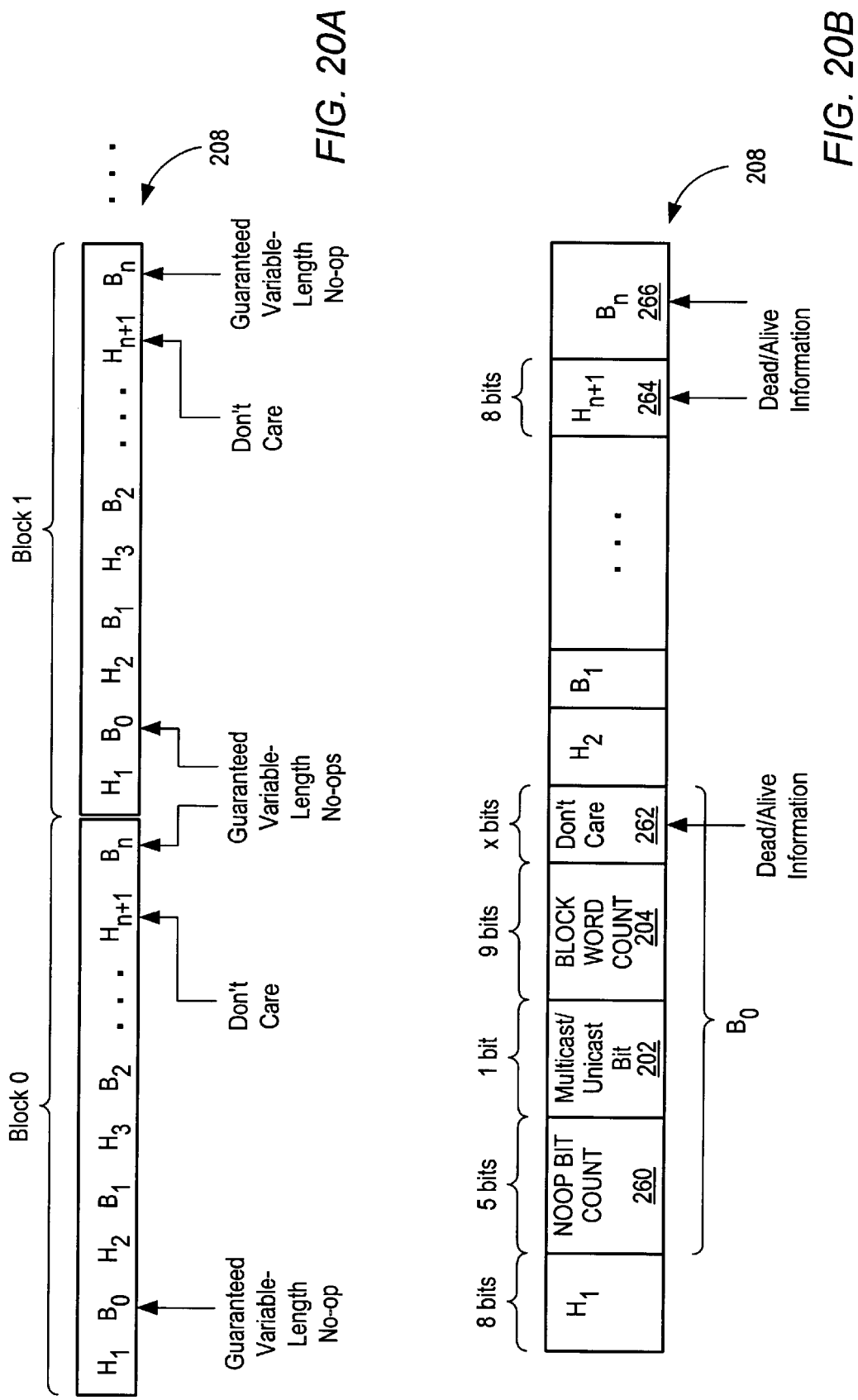
FIG. 20A illustrates one embodiment of a method for encoding compressed geometry data within blocks that are configured to be decompressed independently and in parallel.
FIG. 20B illustrates details of the encoding illustrated in FIG. 20A.

Encoding of Live-Dead Bits—FIGS. 20A–B

FIGS. 20A–B illustrates one type of encoding for live-dead bits in which the live-dead bits are embedded within a "don't care" field of a no-op. Advantageously, backward compatibility may be obtained using this method because non-multicast enabled hardware (e.g., hardware that only has one decompression unit or one decompress/render pipeline) may be configured to ignore the no-op don't care bits and process the blocks sequentially.

FIG. 20A illustrates one embodiment of a method for encoding compressed geometry data within blocks that are configured to be decompressed independently and in parallel. As shown in the figure, data sequence 208 comprises a series of blocks as previously disclosed. In this embodiment, however, each block comprises a variable number of variable length header/body pairs (e.g., $H_1B_1$, $H_2B_2$, etc.). Each header may be separated from its corresponding body. For example header $H_1$ is separated from body $B_1$ by body $B_0$ and header $H_2$. Since the header may contain length information regarding the corresponding body, this separation may be advantageous during the compression process. The separation allows the decompressor to prepare for receiving the header before it is actually received. The time allotted for preparation may improve the ability of the decompressor to effectively pipeline the decompression process. Additional details regarding possible methods for header separation (also referred to as header forwarding) are detailed in U.S. Pat. No. 5,867,167, entitled "Compression of Three-Dimensional Graphics Data Including Quantization, Delta-Encoding, and Variable-Length Encoding" by Michael F. Deering, which is incorporated herein by reference in its entirety.

As also indicted in the figure, in this embodiment the body of the first and last instruction of each block may be defined to be variable-length no-op instructions (i.e., $B_0$ and $B_n$). This may allow certain control information to be embedded within the block without sacrificing backward compatibility. For example, some load-time verifier programs may be configured to implement live/dead encoding as discussed above. The live/dead encoding may then be embedded within the variable length no-ops. However, if a graphics system only has one decompress/render pipeline or for some other reasons does not support live/dead encoding, then the graphics system may be configured to ignore the no-op instruction. In some embodiments, the final header portions $H_{n+1}$, may also be packed with live/dead encoding information and or additional control information.

FIG. 20B illustrates details of the encoding illustrated in FIG. 20A. The headers may contain length information indicating the number of bits, bytes, or words from the header to the corresponding body (i.e., header $H_1$ indicates the length of $B_0$ and possible $H_2$). Alternatively, the header may contain information regarding the length of the corresponding body (i.e., header $H_1$ indicates the length of body $B_1$). In the pictured embodiment, headers are defined to have a fixed length of 8-bits. This limitation may summarily limit the maximum length of the variable-length bodies.

The first and last body of each block may be predefined to have a particular set of fields. For example, the first body portion ($B_0$) of each block may be defined to begin with a fixed-length field 260 that indicates the length of the body portion (e.g., in bits, bytes or words). Multicast/unicast bit 202 may be defined to follow field 260. Next, block length information field 204 may follow. After the first body portion, a fixed or variable number of header-body pairs may follow. As previously noted, the final header and or final body portion may also be defined to indicate a variable or fixed length no-op and may be used to store certain control information.

In some embodiments, state information may be defined as information that is not associated with a particular vertex or set of vertices (e.g., state information that affects all following vertices in the block). For example, the previously described global color change instruction is not associated with a particular vertex and would thus be considered to be a state changing instruction. Thus, color information can be either state information (e.g., global) or non-state information (also referred to herein as geometry information or per-vertex information). A number of different rules may be applied during the compression and or decompression process to simplify the live-dead analysis for state information. For example, in some embodiments a restriction may be imposed that prohibits certain or all state information (e.g., the contents of the transformed vertex memory) from being shared between blocks. Thus a block may not rely on state information set by a previous block. In other embodiments, however, state information may be shared.

Note the example encodings illustrated in the figures are for explanatory purposes only and are not meant to be limiting. Other encodings and configurations are possible and contemplated, depending upon the exact implementation. For example, multicast/unicast bit 202 may be defined as the first field in the first body portion of each block. Furthermore, in some embodiments the header-body pairs may be contiguous instead of being separated. The final body portion (or the second to last, etc.) may be defined to contain a particular instruction that indicates the end of the block is approaching.

INDUSTRIAL APPLICABILITY

A graphics system and method have been disclosed. The features described above may be used individually or in combination and may be realized in software, hardware, or a combination thereof. The system and method may be utilized in a number of different products, including computer systems, graphics accelerator cards, game consoles, set top boxes, portable or hand-held electronic devices, graphics display devices, system on a chip applications, and in other types of electronic devices.

Although the system and method of the present invention has been described in connection with the described embodiments, they are not intended to be limited to the specific forms set forth herein. On the contrary, they are intended to cover such alternatives, modifications, and equivalents as can be reasonably included within the spirit and scope of the invention as defined by the appended claims.

What is claimed is:

1. A graphics system comprising:
   a geometry decompressor configured to receive compressed 3D geometry data, wherein said geometry decompressor is configured to decompress said compressed 3D geometry data into a plurality of vertices;
   a plurality of processors, wherein each processor is configured to transform said vertices into a different coordinate frame, wherein said transforming produces transformed vertices;
   a transformed vertex memory configured to store the transformed vertices; and
   a set up unit configured to assemble geometric primitives from said transformed vertices, wherein said set up unit is configured to use and reuse said transformed vertices stored in said transformed vertex memory to form said geometric primitives.

2. The graphics system as recited in claim 1, wherein said processors are configured to perform one or more vertex processes on said vertices in addition to transforming said vertices, and wherein said transformed vertices stored in said transformed vertex memory are processed vertices.

3. The graphics system as recited in claim 1, wherein said set up unit is configured to reuse said transformed vertices stored in said transformed vertex memory for non-sequential geometric primitives.

4. The graphics system as recited in claim 1, wherein said set up unit is configured to select vertices from said transformed vertex memory according to control information received from said geometry decompressor.

5. The graphics system as recited in claim 4, wherein said geometry decompressor comprises a mesh buffer, and wherein said control information comprises mesh buffer references.

6. The graphics system as recited in claim 1, wherein said geometric primitive is a triangle.

7. The graphics system as recited in claim 1, wherein said processors are further configured to perform lighting calculation on said vertices prior to set up unit assembling the geometric primitives from said transformed vertices.

8. The graphics system as recited in claim 1, wherein said processors are further configured to perform one or more vertex processes on said vertices.

9. The graphics system as recited in claim 1, wherein said geometry decompressor comprises a mesh buffer, and wherein said mesh buffer and said transformed vertex memory are each configured to store up to the same number of vertices.

10. A method for processing graphics data, the method comprising:
    receiving compressed 3D geometry data;
    decompressing the compressed 3D geometry data into a plurality of vertices;
    transforming the plurality of vertices into a different reference coordinate system, wherein said transforming produces transformed vertices;
    storing selected transformed vertices into a transformed vertex memory; and
    forming primitives from the transformed vertices, wherein said forming includes using and reusing the transformed vertices stored in the transformed vertex memory.

11. The method as recited in claim 10, wherein a first subset of the primitives are formed with both transformed vertices stored in said transformed vertex memory and transformed vertices not stored in said transformed vertex memory.

12. The method as recited in claim 11, wherein a second subset of the primitives are formed exclusively with transformed vertices stored in said transformed vertex memory.

13. The method as recited in claim 12, wherein a third subset of the primitives are formed exclusively with transformed vertices not stored in said transformed vertex memory.

14. The method recited in claim 10, wherein said graphics data is compressed using geometry compression, and wherein said decompressing includes selectively storing the vertices into a mesh buffer according to references in the compressed 3D geometry data.

15. The method as recited in claim 14, wherein said transformed vertices are selectively stored in said transformed vertex memory according to said mesh buffer references.

16. The method as recited in claim 15, wherein said transformed vertices are used and reused in forming said geometric primitives according to said mesh buffer references.

17. The method as recited in claim 10, further comprising:
  determining which vertices will be used to form multiple primitives;
  generating tags corresponding to subsequent instances of the reused vertices; and
  using the tags to indicate which transformed vertices should be stored in the transformed vertex memory for later reuse.

18. The method as recited in claim 10, further comprising:
  assigning a tag to each transformed vertex; and
  using said tag to selectively retrieve a particular stored transformed vertex in lieu of transforming the particular vertex more than once.

19. A graphics system comprising:
  a connectivity information generator configured to receive 3D geometry data, wherein said 3D geometry data comprises a plurality of vertices, wherein said connectivity information generator is configured to generate connectivity information indicative of which vertices are to be grouped together to form geometric primitives;
  a plurality of transformation processors, wherein each processor is configured to transform a subset of said plurality of vertices, wherein said transforming produces transformed vertices;
  a transformed vertex memory configured to store the transformed vertices; and
  a set up unit configured to assemble said geometric primitives from said transformed vertices using said connectivity information, wherein said set up unit is configured to use said transformed vertices stored in said transformed vertex memory to form said geometric primitives.

20. The graphics system as recited in claim 19, wherein said connectivity information generator is further configured to encode reuse tags into said connectivity information.

21. The graphics system as recited in claim 20, wherein said set up unit is configured to utilize said reuse tags to determine whether a particular vertex has already been transformed and stored in said transformed vertex memory.

22. The graphics system as recited in claim 20, wherein said transformed vertex memory is a set-associative cache indexed by at least part of said reuse tags.

23. The graphics system as recited in claim 19, wherein said set up unit is configured to invalidate the contents of said transformed vertex memory upon detecting a change in a global rendering attribute.

24. The graphics system as recited in claim 19, wherein said transformation processors are further configured to perform lighting calculations prior to the set up unit assembling the geometric primitives from said transformed vertices.

25. The graphics system as recited in claim 19, wherein said transformation processors are further configured to perform one or more vertex processes.

26. The graphics system as recited in claim 24, wherein said transformed vertex memory is configured to store transformed and lit vertices received from said transformation processors.

27. The graphics system as recited in claim 19, further comprising a plurality of lighting processors coupled between said transformation processors and said transformed vertex memory, wherein said plurality of lighting processors are configured to perform lighting calculations on said transformed vertices, and wherein said transformed vertex memory is configured to store transformed and lit vertices from said lighting processors.

28. The graphics system as recited in claim 19, further comprising a geometry decompressor configured to receive compressed 3D geometry data, decompress said 3D geometry, and convey said decompressed 3D geometry data to said connectivity information generator.

29. The graphics system as recited in claim 19, further comprising one or more draw processors, wherein said draw processors are configured to receive said geometric primitives from said set up unit and render said geometric primitives.

30. The graphics system as recited in claim 29, further comprising a sample buffer, wherein said one or more draw processors are configured to render samples corresponding to said geometric primitives into said sample buffer.

31. The graphics system as recited in claim 29, further comprising a frame buffer, wherein said one or more draw processors are configured to render pixels corresponding to said geometric primitives into said frame buffer.

32. A graphics system comprising:
  a means for generating connectivity information for 3D geometry data, wherein said 3D geometry data comprises a plurality of vertices, wherein said means for generating connectivity information is configured to generate connectivity information indicative of which of said plurality of vertices are to be grouped together to form one or more geometric primitives;
  a means for transforming said plurality of vertices, wherein said transforming produces transformed vertices;
  a storage means for storing at least a subset of said plurality of transformed vertices; and
  a means for assembling said one or more geometric primitives from said transformed vertices based on said connectivity information, wherein said means for assembling is configured to use said transformed vertices stored in said storage means to one or more form said geometric primitives.

33. The graphics system as recited in claim 32, wherein said connectivity information comprises a sequence of vertex tags.

34. The graphics system as recited in claim 32, wherein said connectivity information comprises a plurality of mesh buffer references, wherein said mesh buffer references are indicative of whether said storage means will store a particular transformed vertex for reuse.

35. The graphics system as recited in claim 32, further comprising a means for performing lighting calculations on said transformed vertices prior to the set up unit assembling the geometric primitives from said transformed vertices, wherein said storage means is configured to store processed vertices.

36. The graphics system as recited in claim 32, further comprising a rendering means and a buffer means, wherein said rendering means is configured to receive said geometric primitives from said means for assembling, wherein said rendering means is configured to render said geometric primitives into said buffer means.

37. The graphics system as recited in claim 36, wherein said buffer means is double buffered, wherein one of said double buffers is configured to refresh a display device while the other is being rendered into by said rendering means.

38. A method for processing graphics data, the method comprising:
  receiving the graphics data, wherein said graphics data comprises a plurality of vertices;
  generating connectivity information based on said graphics data;

transforming said plurality of vertices, wherein said transforming produces transformed vertices;

storing at least a subset of said transformed vertices; and forming a plurality of geometric primitives from the transformed vertices based on said connectivity information.

39. The method as recited in claim 38, wherein said forming further comprises using one or more of the stored transformed vertices to form at least a subset of said plurality of geometric primitives according to said connectivity information.

40. The method as recited in claim 38, wherein said connectivity information comprises mesh buffer references.

41. The method as recited in claim 38, further comprising assigning vertex tags to each vertex, wherein said connectivity information comprises a sequence of vertex tags.

42. A method for processing graphics data, the method comprising:

receiving compressed 3D geometry data comprising a plurality of vertices and instructions;

identifying individual vertices in said compressed 3D geometry data with tags;

decompressing the compressed 3D geometry data into a plurality of vertices;

performing one or more vertex processes on the vertices, wherein said performing one or more vertex processes produces processed vertices;

storing one or more of said processed vertices into a processed vertex memory; and forming primitives from the processed vertices, wherein said forming includes reusing one or more processed vertices stored in the processed vertex memory.

43. The method as recited in claim 42, further comprising using said tags to determine which of said stored processed vertices are reused.

44. The method as recited in claim 42, wherein said identifying further comprises identifying which vertices are reused, and wherein only vertices that are reused are tagged.

45. The method as recited in claim 42, wherein a hash table is used to detect reoccurrences of vertices that are stored in the processed vertex memory.

46. A graphics system comprising:

a geometry decompressor configured to receive compressed 3D geometry data, wherein said geometry decompressor is configured to decompress said compressed 3D geometry data into a plurality of vertices;

a plurality of processors, wherein each processor is configured to transform said vertices into a different coordinate frame;

a transformed vertex memory configured to store the transformed vertices; and a set up unit configured to assemble geometric primitives from said transformed vertices, wherein said set up unit is configured to use and reuse said transformed vertices stored in said transformed vertex memory to form said geometric primitives;

wherein said processors are further configured to perform lighting calculation on said vertices prior to set up unit assembling the geometric primitives from said transformed vertices.

47. A method for processing graphics data, the method comprising:

receiving compressed 3D geometry data;

decompressing the compressed 3D geometry data into a plurality of vertices;

transforming the plurality of vertices into a different reference coordinate system;

performing lighting calculations on the plurality of vertices;

storing selected transformed vertices into a transformed vertex memory; and forming primitives from the transformed vertices, wherein said forming includes using and reusing the transformed vertices stored in the transformed vertex memory;

wherein said performing lighting calculations on the plurality of vertices occurs prior to forming primitives from the transformed vertices.

\* \* \* \* \*